US008325214B2

(12) United States Patent
Hildreth

(10) Patent No.: US 8,325,214 B2
(45) Date of Patent: Dec. 4, 2012

(54) ENHANCED INTERFACE FOR VOICE AND VIDEO COMMUNICATIONS

(75) Inventor: Evan Hildreth, Ottawa (CA)

(73) Assignee: Qualcomm Incorporated, San Diego, CA (US)

( * ) Notice: Subject to any disclaimer, the term of this patent is extended or adjusted under 35 U.S.C. 154(b) by 1073 days.

(21) Appl. No.: 12/235,831

(22) Filed: Sep. 23, 2008

(65) Prior Publication Data

US 2009/0079813 A1    Mar. 26, 2009

Related U.S. Application Data

(60) Provisional application No. 60/974,774, filed on Sep. 24, 2007.

(51) Int. Cl.
H04N 7/14 (2006.01)
(52) U.S. Cl. ............... 348/14.03; 348/14.07; 348/14.16; 715/863
(58) Field of Classification Search .... 348/14.01–14.16; 715/852, 863
See application file for complete search history.

(56) References Cited

U.S. PATENT DOCUMENTS

| | | | |
|---|---|---|---|
| 5,594,469 A * | 1/1997 | Freeman et al. ............... | 345/158 |
| 5,745,165 A | 4/1998 | Atsuta et al. | |
| 6,160,899 A | 12/2000 | Lee et al. | |
| 6,191,773 B1 * | 2/2001 | Maruno et al. ................. | 345/158 |
| 6,272,231 B1 | 8/2001 | Maurer et al. | |
| 6,301,370 B1 | 10/2001 | Steffens et al. | |
| 6,775,014 B2 | 8/2004 | Foote et al. | |
| 6,827,579 B2 | 12/2004 | Burdea et al. | |
| 6,894,714 B2 * | 5/2005 | Gutta et al. ................. | 348/14.07 |
| 6,920,942 B2 | 7/2005 | Koederitz | |
| 7,018,211 B1 | 3/2006 | Birkhölzer et al. | |
| 7,598,942 B2 * | 10/2009 | Underkoffler et al. ........ | 345/158 |
| 7,761,505 B2 * | 7/2010 | Krzyzanowski et al. ..... | 709/204 |
| 7,999,843 B2 * | 8/2011 | Ohba et al. ..................... | 348/41 |
| 2002/0041327 A1 | 4/2002 | Hildreth et al. | |
| 2002/0064149 A1 | 5/2002 | Elliott et al. | |
| 2004/0047461 A1 | 3/2004 | Weisman et al. | |
| 2005/0080849 A1 | 4/2005 | Wee et al. | |
| 2005/0239028 A1 | 10/2005 | Wu et al. | |
| 2006/0101016 A1 | 5/2006 | Uehara | |
| 2006/0202953 A1 | 9/2006 | Pryor et al. | |
| 2007/0009139 A1 | 1/2007 | Landschaft et al. | |
| 2007/0057912 A1 * | 3/2007 | Romriell et al. ............. | 345/156 |
| 2007/0188597 A1 * | 8/2007 | Kenoyer ..................... | 348/14.08 |
| 2007/0200916 A1 * | 8/2007 | Han ............................ | 348/14.01 |
| 2008/0089587 A1 | 4/2008 | Kim et al. | |
| 2008/0159177 A1 * | 7/2008 | Balachandran et al. ...... | 370/260 |

(Continued)

OTHER PUBLICATIONS

Office Action for U.S. Appl. No. 12/102,587, mailed Dec. 10, 2010, 10 pages.

(Continued)

*Primary Examiner* — Curtis Kuntz
*Assistant Examiner* — Ryan Robinson
(74) *Attorney, Agent, or Firm* — Kilpatrick Townsend & Stockton LLP

(57) ABSTRACT

An enhanced interface for voice and video communications, in which a gesture of a user is recognized from a sequence of camera images, and a user interface is provided include a control and a representation of the user. The process also includes causing the representation to interact with the control based on the recognized gesture, and controlling a telecommunication session based on the interaction.

23 Claims, 27 Drawing Sheets

U.S. PATENT DOCUMENTS

2008/0297589 A1* 12/2008 Kurtz et al. ............... 348/14.16

OTHER PUBLICATIONS

Supplementary Search Report for European Application No. 08834565.7, mailed Oct. 28, 2010, 2 pages.
Internatioal Search Report and Written Opinion—PCT/US2008/077351—ISA/EPO—Dec. 1, 2008.
Communication pursuant to Article 94(3) EPC for corresponding European Application No. 08834565.7, mailed Dec. 2, 2010, 6 pages.
Fussell et al. 'Gestures Over Video Streams to Support Remote Collaboration on Physical Tasks'. In: Human-Computer Interaction, vol. 19, p. 273-309. Published Sep. 2004. [retrieved on Nov. 12, 2008]. Retrieved from the Internet: <URL: http://www.cs.cmu.edu/~sfussell/pubs/Manuscripts/Fussell_Gestures_HC1_2004.pdf>.

* cited by examiner

ENHANCED INTERFACE FOR VOICE AND VIDEO COMMUNICATIONS

CROSS-REFERENCE TO RELATED APPLICATION

This application claims the benefit of U.S. Provisional Patent Application No. 60/974,774, filed on Sep. 24, 2007, which is incorporated herein by reference.

FIELD

The present disclosure relates to user input mechanisms, and at least one particular arrangement is directed to a user input mechanism configured to enable a user to control voice and video communications.

BACKGROUND

Various video-based electronic control systems may permit a user to interact with a computer application or other voice or video applications. However, these systems may be poorly suited for entering text, numbers, or for selecting from a large number of options.

SUMMARY

According to one general implementation, a user may control a communication session, such as a teleconference session, by performing various specified gestures. By accessing images of the user at various times, the gestures are automatically recognized and mapped to control inputs, such as inputs for commencing or terminating the telecommunication session, or inputs for placing the session in various states. Among other features, the interface may display customized icons that initially surround a representation (e.g. an avatar) of a recognized user, effecting the easy selection of commands of characters through straightforward, intuitive, and natural motions of the user's body.

According to another general implementation, a computer-implemented process includes recognizing a gesture of a user from a sequence of camera images, and providing a user interface including a control and a representation of the user. The process also includes causing the representation to interact with the control based on the recognized gesture, and controlling a telecommunication session based on the interaction.

Implementations may include one or more of the following features. For instance, controlling the telecommunication session may further include changing the telecommunication session from a first state to a second, different state, and the first or second states may include a standby state, a notification state, an outgoing call state, a connecting state, a mute state, a menu state, a connection options state, a direct dial state, a redial state, a search state, a browse state, a message menu state, a message playback state, or a configuration state. The telecommunication session may further include a voice and video telecommunication session.

In additional example implementations, controlling the telecommunication session may further include changing the telecommunication session from a standby state to a call or menu state based on recognizing an engagement gesture. The process may also include determining an identity of the user, and enabling the control based on the determined identity. The process may include changing the telecommunication session from a connecting state to a call state only if the determined identity of the user matches an intended recipient of a call. The process may include determining identities of users within the image, and enabling or disabling the control based on at least one of the determined identities.

In further example implementations, controlling the telecommunication session may include changing the telecommunication session to a standby state based on recognizing a disengagement gesture. The process may include focusing one of the camera images on the user, where focusing the one of the camera images may include maintaining focus of a camera on the user, who is moving, or centering the one of the camera images on the user. The process may include localizing audio to focus on the user. Recognizing a gesture of the user may include recognizing that a second user has performed a second engagement gesture after a first user has performed a first engagement gesture, and controlling the telecommunication session may include changing a focus to the second user based on recognizing that the second user has performed the second engagement gesture.

In other example implementations, the process may include determining whether the first user has relinquished the focus, the focus may be changed only if the first user has relinquished the focus. Determining whether the first user has relinquished the focus may include determining whether the first user has finished speaking, or determining whether the first user has performed a relinquishment gesture. The process may include determining an identity of the user, where controlling the telecommunication session further includes displaying, in a browse state, a set of contacts associated with the determined identity, or transmitting the determined identity of the user to a recipient of a call placed by the user.

According to another general implementation, a device includes a processor configured to recognize a gesture of a user from a sequence of camera images, and to provide a user interface including a control and a representation of the user. The processor is further configured to cause the representation to interact with the control based on the recognized gesture, and to control a telecommunication session based on the interaction.

According to another general implementation, a computer-readable medium is encoded with a computer program. The computer program includes instructions that, when executed, operate to cause a computer to perform operations including recognizing a gesture of a user from a sequence of camera images, and providing a user interface including a control and a representation of the user. The operations also include causing the representation to interact with the control based on the recognized gesture, and controlling a telecommunication session based on the interaction.

According to another general implementation, a system includes one or more computers, and a computer-readable medium coupled to the one or more computers. The computer-readable medium has instructions stored thereon which, when executed by the one or more computers, cause the one or more computers to perform operations including recognizing a gesture of a user from a sequence of camera images, and providing a user interface including a control and a representation of the user. The operations also include causing the representation to interact with the control based on the recognized gesture, and controlling a telecommunication session based on the interaction.

The details of one or more implementations are set forth in the accompanying drawings and the description, below. Other potential features and advantages of the disclosure will be apparent from the description and drawings, and from the claims.

DETAILED DESCRIPTION

Using the enhanced approached described herein, a user may control a communication session, such as a teleconference session, by performing various specified gestures. By accessing images of the user at various times, the gestures are automatically recognized and mapped to control inputs, such as inputs for commencing or terminating the telecommunication session, or inputs for placing the session in various states. Among other features, the interface may display customized icons that initially surround a representation (e.g. an avatar) of a recognized user, effecting the easy selection of commands of characters through straightforward, intuitive, and natural motions of the user's body.

Thus, an approach is described that allows a user to control voice and video communications using camera tracking. This approach may, for example, be used in a boardroom setting, where a communications system may be physically out of reach of users, or in another location where the user may wish to appear as if in a business setting. This approach also may, for example, be used in a living room setting, where a user sitting on a sofa may interact with a communications system including an interface displayed on a television or other display device.

The approach may recognize a gesture of a user from a sequence of camera images and provide a user interface which includes a control and a representation of the user. Based on the recognized gesture, the system may cause the representation to interact with the control, and then control a telecommunication session based on the interaction.

For example, the system may include a hand gesture identification process configured to detect a user's hand gestures, and perform functions based on the detected hand gestures. For example, a user may answer an incoming call by performing a hand, arm or body "engagement" gesture. In implementations in which multiple users participate in a call, a user may obtain or change focus by performing the same or a different gesture, such as a "disengagement" gesture, a "change of focus" gesture, or a "release of control" gesture.

Figure 1:
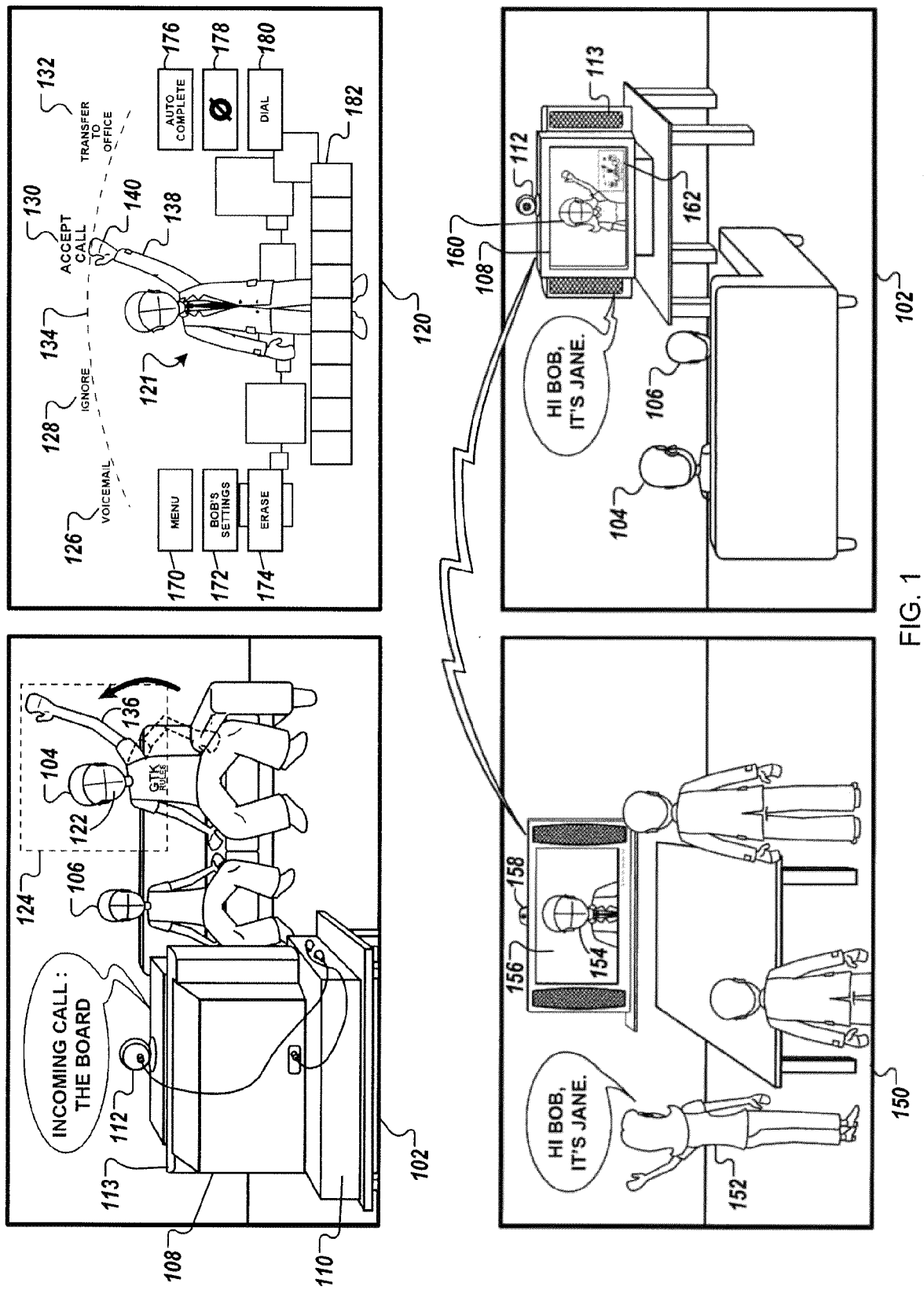
FIG. 1 is a conceptual diagram illustrating enhanced camera-based input.

FIG. 1 is a contextual diagram illustrating enhanced camera-based input. FIG. 1 includes a view of a living room 102. A user 104 (i.e., "Bob") is informally attired, and is sitting on a couch in the living room 102, next to a child 106. The user 104 and child 106 are sitting in front of a display 108 (e.g., a television screen), and may be watching a program or playing a video game prior to the reception of a call.

The display 108 is connected to a media hub 110. The media hub 110 is configured to accept incoming telephone or video conference calls. The media hub 110 is connected to or otherwise includes a camera 112 (e.g. a webcam). In this implementation, the display 108 includes speakers 113. In other implementations, the speakers 113 are included in the media hub or are external to the media hub and display 108 (e.g. television speakers). The media hub 110 also includes or is otherwise connected to a microphone for receiving and digitizing ambient sounds.

In this example, the media hub 110 detects an incoming call and alerts the user 104 via an audio and/or video message. In this example, the user 104 is alerted that the incoming call is from the board of directors at the user's company when the speakers 113 output audio indicating "Incoming Call: The Board." Such an alert may be generated, for example, by applying a text-to-speech capabilities to a caller-ID system, or by other mechanisms. While Bob's informal attire and surroundings might otherwise cause him concern when conducting a formal teleconference, the enhanced approach described herein addresses these problems by generating a visual avatar which hides his informal attire and surroundings, or substitutes a more suitable visualization.

In response to detecting of the incoming call, a user interface 120 may be displayed on the display 108, possibly replacing, or partially or completely overlapping the video content that the user 104 had been viewing on the display 108 before the receipt of the call. The user interface 120 includes a user representation 121. The user representation 121 in this example is an avatar which displays the face 122 of the user 104 as captured by the camera 112 in a region 124 in the camera's field of view.

Although the user 104 is not wearing business attire, the user representation 121 is shown in the user interface 120 as wearing a suit and tie. The appearance of the user representation 121 (e.g., the appearance of the avatar) may vary based on the identity of the caller, time of day, user preferences, or other factors. For instance, depending on user settings, the user representation may be configured to look more like, or less like the user 104. In more extreme examples, the user representation 121 may be attired with a tuxedo, or in less formal attire (i.e. a swimsuit) than the user 104 is actually wearing. Furthermore, the user's face 122 or other body part may also be changed, for instance to appear thinner, to have a different haircut or style, to remove accessories (i.e. jewelry), or to have a completely different look altogether (i.e. that of a monster, an alien, a cartoon character, another person, or any other outward appearance).

The user interface 120 includes representations of items 126-132. The items 126-132 may be aligned along a guide line 134. The guideline 134 may or may not be displayed.

The user representation 121 is controlled in response to the movements or gestures of the user 104. For example, as the user 104 raises his left arm 136, a left arm 138 of the user representation 121 is raised in a corresponding manner. In other examples, the user's motions and the user representations' motions may be mirrored. The user 104 may move their arm 136 to cause a hand 140 of the user representation 121 to move near to or overlap one of the items 126-132. For example, the hand 140 may overlap the "accept call" item 130, resulting in an interaction with the item 130. As a result of the interaction with the "accept call" item 130, the incoming call is accepted.

FIG. 1 includes a view of a board room 150. A caller 152 (i.e., "Jane") is standing in the board room 150, along with other people, where the caller 152 is performing a similar gesture using a similar system, to invoke the call. As a result of the user 104 accepting the incoming call from the caller 152, an image 154 of the user representation 121 is shown on a display 156 mounted in the board room 150. The image 154 is centered around the user 104 and does not display others (i.e. the child 106) in the living room 102. The display 156, as well as a camera 158 and a microphone, may be connected to a media hub located in the board room 150.

A representation 160 of the caller 152, captured by the camera 158, is shown on the display 108. Audio of the voice of the caller 152 (i.e., "Hi Bob, it's Jane") captured by a microphone in the board room is played on the speakers 113. An inset 162 of the display 108 displays the user interface 120, allowing the user to control the communication further, for instance to disconnect the call or to place the call on mute.

The user interface 120 also includes a menu button 170, a user-settings button 172, an erase button 174, an auto-complete button 176, a button 178 that is in a disabled state, a dial button 180, and a text area 182. The menu button 170 may be selected to display additional features. The user-settings button 172 may be selected to configure settings which are specific to the user 104. For example, a face detection and recognition process may have identified the user 104.

The user 104 may enter a phone number or a contact name, or text messages, into the text area 182. For example, representations of letters may be displayed along the guide line 134, and selected letters may be displayed in the text area 182. The user may select the dial button 180 to connect a call to the phone number or contact displayed in the text area 182. The auto-complete button 176 may be selected to accept a previously dialed number or contact name which is partially matched by the text displayed in the text area 182. The user may select the erase button 174 to erase characters from the text area 182.

The user 104 may select the voicemail item 126 to navigate to a voicemail feature. The ignore item 128 may be selected to ignore an incoming call. The transfer-to-office item 132 may be selected, for example, to transfer an incoming call to an office extension.

The button 178 may be in a disabled state due to the detected presence of the child 106, or for another reason. For example, speed-dial or long-distance-dial functionality or access to adult-oriented content may be disabled if a child is detected within the field of view of the camera 112. In another example, the functionality associated with the button 178 may be disabled by the communications provider, for instance where a text messaging service is under repair or where service is otherwise suspended.

Figure 2:
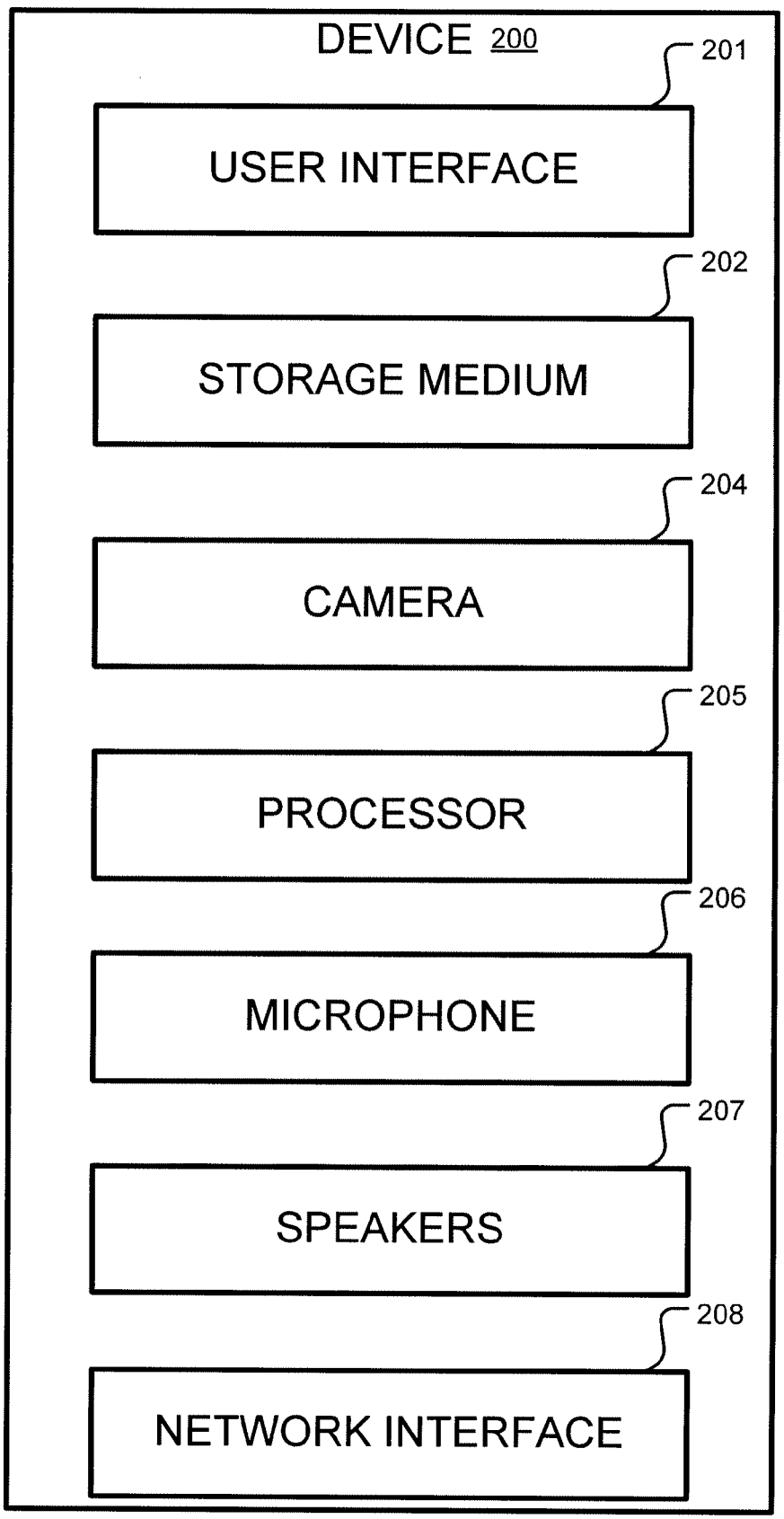
FIG. 2 is a block diagram of a device used to implement enhanced camera-based input.

FIG. 2 is a block diagram of a device 200 used to implement enhanced camera-based input. Briefly, the device 200 includes, among other things, a user interface 201, a storage medium 202, a camera 204, a processor 205, a microphone 206, one or more speakers 207, and a network interface 208. Certain elements, or their associate functionalities, may be combined.

Figure 3:
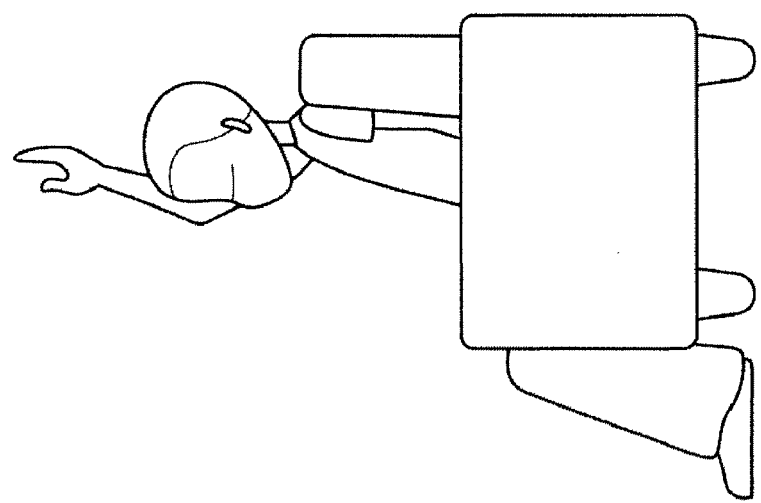
FIG. 3 illustrates an arrangement of components of a device.
Figure 3:
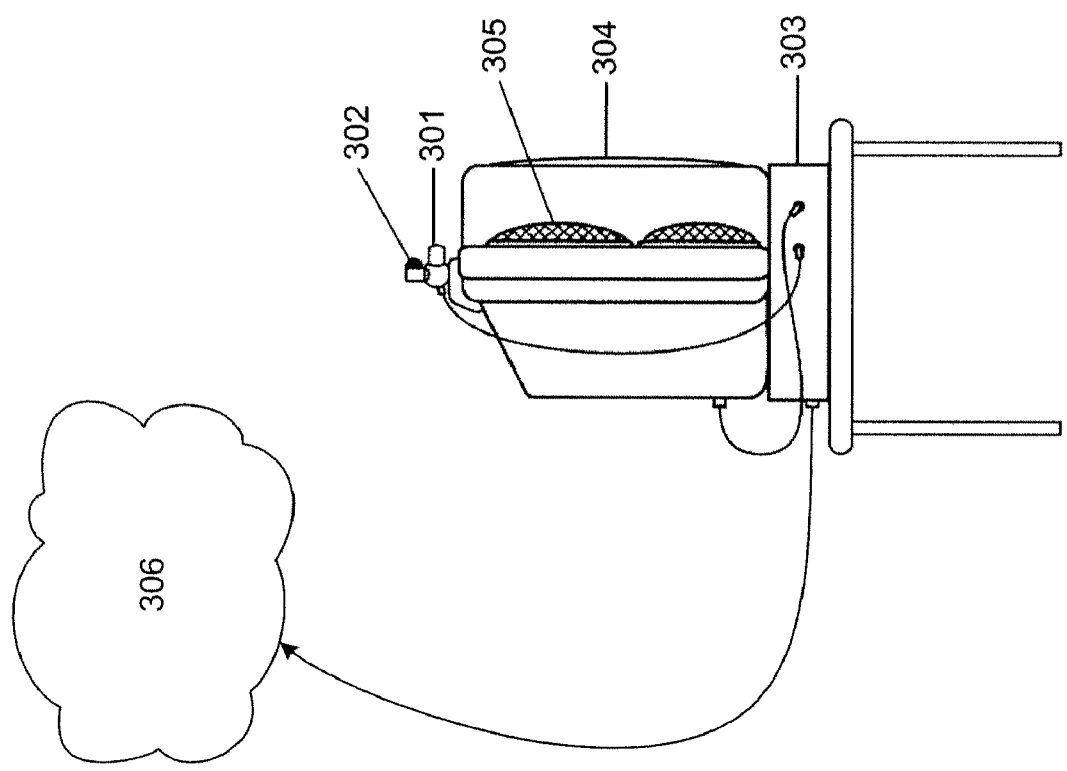

An example physical arrangement of components of the device 200 is shown in FIG. 3, where a camera 301 and a microphone 302 are connected to a processor 303 and sit atop a display 104. Speakers 305 are affixed to the display 304 and the processor 303 is connected to a network 306.

Referring back to FIG. 2, the processor 205 may be included in a PC (personal computer), a cable television receiver, a video game console, a phone, or another type of device. The processor 205 may be included in any type of electronic device and may operate in combination with multiple processors. The camera 204 captures or otherwise produces camera images which may be transmitted to the processor 205. The processor 205 may process the camera images using techniques described throughout this disclosure.

The microphone 206 may be omnidirectional or unidirectional, and accepts a filtered or unfiltered audible input and may produce sound data which is transmitted to the processor 205. The processor 205 may produce user interfaces for rendering on the user interface 201 and the processor 205 also may produce audio data which is transmitted to and converted into sound by the speakers 207.

Using the device 200, enhanced camera-based input may be used to facilitate interaction with a control of a user interface, for example to allow for selection of the items by a user. Interaction with controls does not require the user to hold any specialized object, such as a retro-reflector, gyroscopic device, or remote control in their hands, but rather intuitively maps arm or hand motions to cursor or other inputs. Based on the particular desired configuration of the system, specialized objects may be used.

The user interface 201 is a mechanism for allowing a user to interact with the device, or with applications invoked by the device. The user interface 201 may effect both input and output, allowing a user to manipulate the device or for the device to produce the effects of the user's manipulation. The device 200 may utilize any type of user interface 201, such as a graphical user interface (GUI), a voice user interface, or a tactile or haptic user interface.

The user interface 201 may be configured to render a visual display image. For example, the user interface 201 may be a monitor, a television, a liquid crystal display (LCD), a plasma display device, a projector with a projector screen, an auto-stereoscopic display, a cathode ray tube (CRT) display, a digital light processing (DLP) display, or any other type of display device configured to render a display image. The user interface 201 may include one or more display devices. In some configurations, the user interface 201 may be configured to display images associated with an application, such as display images generated by an application, including a control and an object such as an avatar. The storage medium 202 stores and records information or data, and may be an optical storage medium, magnetic storage medium, flash memory, or any other storage medium type.

The camera 204 is a device used to capture images, either as still photographs or a sequence of moving images. The camera 204 may use the light of the visible spectrum or with other portions of the electromagnetic spectrum, such as infrared. For example, the camera 204 may be a digital camera, a digital video camera, or any other type of device configured to capture images. The camera 204 may include one or more cameras. In some examples, the camera 204 may be configured to capture images of an object or user interacting with an application. For example, the camera 204 may be configured to capture images of a user or person physically interacting with an application within the field of view of the camera 204.

The camera 204 may be a stereo camera, a time-of-flight camera, or any other camera. For instance, the camera 204 may be an image detector capable of sampling a background image in order to detect motions and, similarly, gestures of a user. The camera 204 may produce a grayscale image, color image, or a distance image, such as a stereo camera or time-of-flight camera capable of generating a distance image. A stereo camera may include two image sensors that acquire images at slightly different viewpoints, where a processor compares the images acquired from the different viewpoints to calculate the distance of parts of the images. A time-of-flight camera may include an emitter that generates a pulse of light, which may be infrared light, where the time the pulse of light travels from the emitter to an object and back to a sensor is measured to calculate the distance of parts of the images.

The device 200 is electrically connected, over a wireline or wireless pathway, to the camera 204 and the user interface 201, and is configured to control the operation of the processor 205 to provide for camera-based input. In one configuration, the device 200 uses the processor 205 or other control circuitry to execute an application that provides for the enhanced camera-based input. Specifically, the device receives inputs from the camera 204 and processes the received inputs to calculate the position and movement of a representation of a user in the user interface 201, and to interact with a control based on these movements.

In one example implementation, input occurs by using a camera to detect images of a user performing gestures. For instance, a mobile phone may be placed on a table and may be operable to generate images of a user using a face-forward camera. Alternatively, the gesture may be detected or recognized using the camera 204, such as by detecting a "tilt left" gesture using optical flow or some other approach, and using this detected gesture to move a representation of the user left and to select an item disposed on the left side of a control, or by detecting a "tilt forward and right" gesture to move a representation of the user up and to the right of a neutral position, to select an item disposed on an upper right side of a control.

Thus, the camera 204 may also include or be replaced by some other type of input device or module capable of detecting an angular position of the device 200, such as a gyroscope, accelerometer, or an optical flow tracker. In this regard, the camera may be supplemented with or replaced by a tilt-sensor input to perform functions or commands desired by the user. As such, detection of a user's gesture may occur without using a camera. By moving the device, for example, in the same kind of stroke pattern that is visualized on the control on the user interface, the user is enabled to control the same interface or application in a straightforward, intuitive, and visually pleasing and stimulating manner.

The microphone 206 may include multiple sensors that are operable to spatially localize sounds. The microphone 206 may include a filtering process operable to suppress background noise and cancel echoes. The microphone 206 may be part of the user interface 201, such as where a computer monitor includes an on-board microphone, or may be separate from the user interface 201, such as where a webcam with a built-in microphone is connected to a USB port on the computer monitor. The audio speakers 207 are operable to produce sound. Similar to the microphone 206, the audio speakers 207 may be part of the user interface 201 or may be separate from the user interface 201.

The processor 205 may be connected one or more networks over a network interface 208. The processor 205 may connect to a computer, telephone, or video network (e.g., the Internet, a Voice over Internet Protocol (VOIP), a public switched telephone network (PSTN), a teleconferencing service, or a cable television service) capable of transmitting audio or video communications to other systems. Networks may include, for example, one or more of the Internet, Wide Area Networks (WANs), Local Area Networks (LANs), analog or digital wired and wireless telephone networks (e.g., a PSTN, Integrated Services Digital Network (ISDN), and Digital Subscriber Line (xDSL)), radio, television, cable, satellite, and/or any other delivery or tunneling mechanism for carrying data or VOIP services.

Networks may further may include a circuit-switched voice network, a packet-switched data network, or any other network able to carry voice communications. For example, circuit-switched voice networks may include the PSTN, and packet-switched data networks may include networks based on the Internet protocol (IP), X.25, or Frame Relay, or other comparable technologies and may support voice using, for example, VOIP, or other comparable protocols used for voice data communications. Networks may include multiple networks or subnetworks, each of which may include, for example, a wired or wireless data pathway.

The device 200 may implement processes to facilitate voice and video communications. For instance, the processor 205 may execute an application related to voice and video communications and render an interface on the user interface 201 that allows a user to interact with the application related to voice and video communications.

The device 200 may implement an audio data decompression process. Voices from a remote user may be transmitted over a network as compressed data, which is decompressed before being converted to sound by the speakers 207. An audio data decompression process may utilize an audio compression method, such as Code Excited Linear Prediction (CELP), Advanced Audio Coding (AAC), or others.

The device 200 may implement a video data decompression process. Video of a remote user may be transmitted over a network as compressed data, which is decompressed before being displayed by the user interface 201. A video decompression process may utilize a video compression method, such as International Telecommunications Union (ITU) H.323, H.264, Moving Picture Experts Group (MPEG) MPEG-2, MPEG-4, or others.

The device 200 may implement an audio echo cancellation process. Echo cancellation may include acoustic echo cancellation. An acoustic echo may occur when sound produced by the speakers 207 is sensed by the microphone 206. Therefore, voices from a remote user transmitted over a network and played through the speakers 207 may be sensed by the microphone 206 and transmitted back over the network to the remote user. This may be undesirable. Acoustic echoes may be influenced by characteristics of the speakers 207, microphone 206, and environment (e.g., reverb or acoustic properties of the room).

An acoustic echo cancellation process may include sampling a reference audio signal, using a speaker to produce sound from the reference audio signal, using a microphone to sense the sound produced by the speakers, and sampling the sound sensed by the microphone as a second audio signal. A predicted reference audio signal that compensates for the influence of the characteristics of the speakers, microphone and environment may be generated and compared to the second audio signal. The predicted reference audio signal may be removed from the second audio signal to produce a third audio signal where echoes are suppressed or eliminated. This disclosure is not limited to a particular echo cancellation process and other techniques for echo cancellation may be used.

The device 200 may implement an audio data compression process. Voices from a local user, sensed by a microphone and processed by an echo cancellation process, may be compressed, and transmitted over a network to a remote user as compressed data. An audio data compression process may utilize an audio compression method, such as Code Excited Linear Prediction (CELP), Advanced Audio Coding (AAC), or others.

The system may implement a video data compression process. Video of a local user, captured by a camera, may be compressed, and transmitted over a network to a remote user as compressed data. A video compression process may utilize a video compression method, such as International Telecommunications Union (ITU) H.323, H.264, Moving Picture Experts Group (MPEG) MPEG-2, MPEG-4, or others.

The processor 205 may be operable to perform several camera tracking processes, including a hand gesture identification process, a face detection process, a face identification process, a user position process, a process to generate a representation of a user, and a process to compare a user position with application generated items. Some of these processes are optional, or may be combined. The system is not limited to these processes and may perform other processes to implement the techniques described throughout this disclosure.

In some implementations, the processor 205 may be operable to perform several voice and video communication processes, including an audio decompression process, a video decompression process, an audio echo cancellation process, an audio compression process, and a video compression process. Some or all processes for facilitating voice and video communications may be executed by the processor 205. Alternatively, the processor 205 may communicate with an external device that performs communication operations.

Although the device 200 has been described as a personal computer (PC) or set top box, such a description is made merely for the sake of brevity, and other implementations or manifestations are also contemplated. For instance, the device 200 may be implemented as a television, a music player, a digital picture frame, an ultra-mobile personal computer (UMPC), a mobile internet device (MID), a digital picture frame (DPF), a portable media player (PMP), a general-purpose or special-purpose computer (e.g., a desktop computer, a workstation, or a laptop computer), a server, a gaming device or console, or any other type of electronic device that includes a processor or other control circuitry configured to execute instructions, or any other apparatus that includes a user interface.

Figure 4:
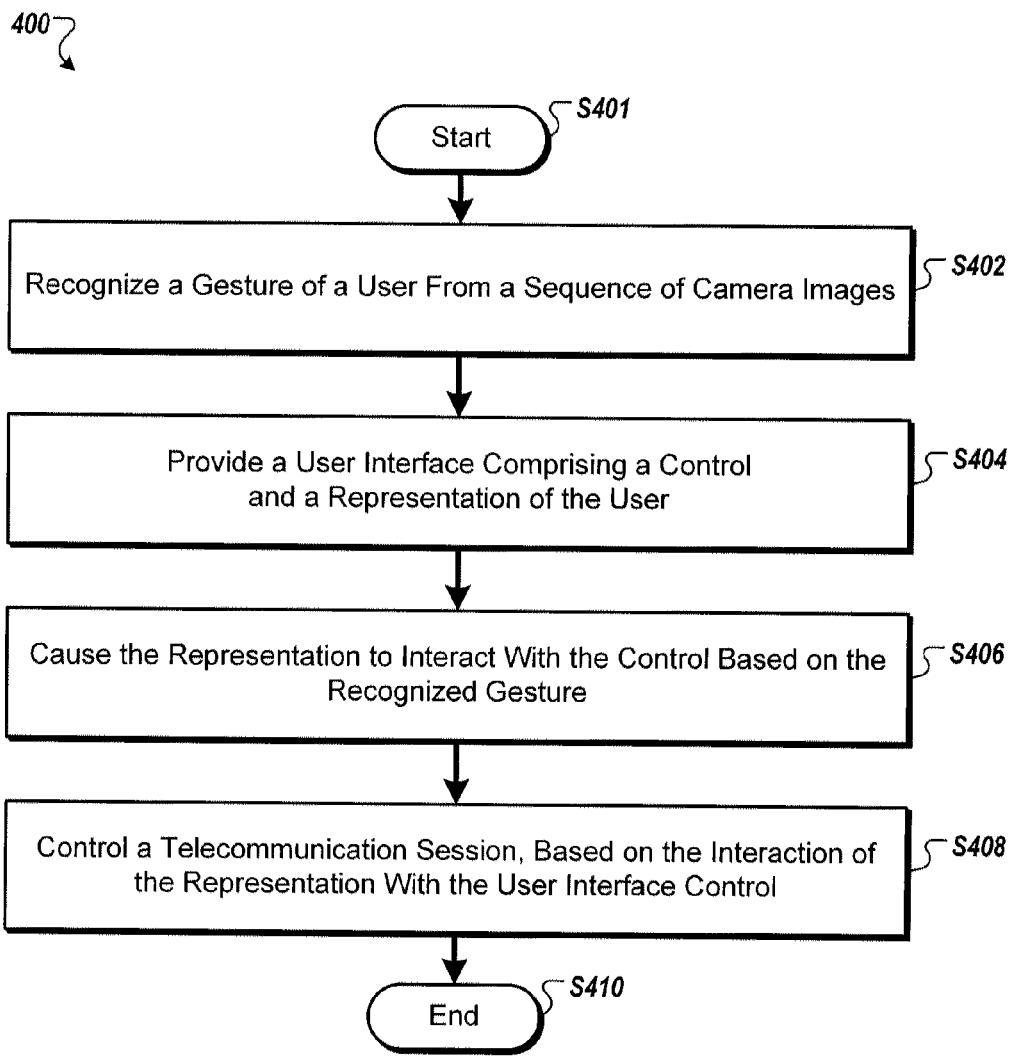
FIG. 4 illustrates an exemplary process that uses enhanced camera-based input.

FIG. 4 illustrates an exemplary process 400 for controlling a telecommunication session. Briefly, the process 400 includes recognizing a gesture of a user from a sequence of camera images, providing a user interface including a control and a representation of the user, causing the representation to interact with the control based on the recognized gesture, and controlling a telecommunication session based on the interaction. Other processes may also be used, and the process 400 may occur in a different order than illustrated or include fewer or more operations.

In more detail, when the process 400 begins (S401), a gesture of a user is recognized from a sequence of camera images (S402). For example, one or more camera images may be monitored to identify hand gestures or gestures made with other objects or body parts. For instance, a camera may capture one or more images of a user interacting with an interface displayed on a display device. A processor may access the images captured by the camera and identify a hand gesture by processing the images.

As used herein throughout, a "gesture" is intended to refer to a form of non-verbal communication made with a whole or part of a human body or multiple human bodies, and is contrasted with verbal communication such as speech. For instance, a gesture may be defined by a movement, change or transformation between a first position, pose, or expression and a second pose, position or expression. Example gestures include for instance, an "air quote" gesture, a bowing gesture, a curtsey, a cheek-kiss, a finger or hand motion, a genuflection, a head bobble or movement, a high-five, a nod, a sad face, a raised fist, a salute, a swiping or wave motion, a thumbs-up motion, a hand-moving-in-circle or hand waving gesture, or a finger pointing gesture.

Accordingly, from a sequence of images, a gesture may be derived that defines an idea, opinion, emotion, communication, command, demonstration or expression of the user. For instance, the user's gesture may be a single or multiple finger gesture; a single hand gesture; a single hand and arm gesture; a single hand and arm, and body gesture; a bimanual gesture; a change in head pose or posture; a change in an eye position; a change in a facial expression; a change in a body pose or posture, or a transformation of any other expressive body state.

For brevity, the body part or parts used to perform relevant gestures are generally referred to as a "control object." For instance, the user may express a command using their entire body or with other physical objects, in which case their entire body or the other physical objects may be the control object. A user may more subtly express a command by blinking their eye, by flaring their nostrils, or by wiggling a finger, in which case the eyelid, nose, or finger may be the control object. The user's gesture in a single image or between two images may be expressive of an enabling or "engagement" gesture. A control object may also be a physical device, such as an infrared finger light, a retro-reflector, or a remote control.

A process to identify hand gestures may include analyzing motion. Analyzing motion may include calculating an optical flow map from a sequence of camera images, clustering regions of the flow map having motion of similar direction and magnitude, and comparing the clustered motion of a period of time to a statistical model (e.g., a Hidden Markov Model) to classify the motion as a gesture. Motion is appearance and position invariant and, accordingly, may be detected on infrared camera image sequences (e.g., it does not depend on skin color). In implementations in which motion is detected in infrared camera image sequences, gestures may be detected in low ambient light. Motion analysis may use two dimensional motion, or three dimensional motion when used with a camera capable of measuring distance (e.g., a stereo camera or time-of-flight camera).

A process to identify hand gestures may include analyzing color. Analyzing color may include comparing camera images to a color model, identifying parts of the camera image that have colors consistent with human skin, clustering those parts of the camera image having colors consistent with human skin, and classifying a cluster as a hand if it meets a set of size and shape criteria. Analyzing color further may include comparing cluster shape to a set of hand pose criteria to classify a hand pose as a hand gesture. Analyzing color may alternatively include generating a path of the hand cluster position over a period of time, and comparing the path to a statistical model to classify the motion as a gesture.

A process to identify hand gestures may include analyzing features. Analyzing features may include identifying primitive shape features (e.g., edges) within camera images, and identifying a set of features that may correspond to a hand. The spatial arrangement of features may be compared to a statistical model to classify the hand pose or hand movement as a gesture.

A process to identify hand gestures further may include comparing a hand position to a face (or body) position, and using the relative hand position. A face position may be determined by a face detection process and a relative hand position to a detected face may be used to detect a gesture or other input command.

A process to identify hand gestures may include a combination of motion, color, and shape techniques. This disclosure is not limited to a particular hand gesture detection process and other techniques for detecting hand gestures or other input commands may be used.

The system may implement a process to detect faces within one or more camera images. The face detection process may determine the location, size, or other physical characteristics of human faces within the one or more camera images.

A process to detect faces within a camera image may include analyzing color. Analyzing color may include comparing camera images to a color model, identifying parts of the camera image that have colors consistent with human skin and facial features, clustering those parts of the camera image having colors consistent with human skin and facial features, and classifying a cluster as a face if it meets a set of size and shape criteria.

A process to detect faces within a camera image may include analyzing features. Analyzing features may include identifying features (e.g., edges or gradients) within one or more camera images, and identifying a set of features that may correspond to a face. This disclosure is not limited to a particular face detection process and other techniques for detecting faces may be used.

The system may implement a process to recognize a face within one or more camera images to identify a particular user. For example, the processor 103 may analyze images captured by the camera 101 to detect a face of a user located in front of the camera 101. After detecting a face, the processor 103 then may analyze the detected face to determine whether the detected face belongs to an identifiable or known user.

A process to identify faces within a camera image may include selecting a part of an image where a face is detected, and comparing that part of an image to a template. The system may include templates of users. The templates may be generated in a configuration state using techniques described in more detail below.

A process to identify a face within a camera image, where a range camera (e.g., a stereo camera or a time-of-flight camera) is used, may include using a three-dimensional face recognition process. A three-dimensional face recognition process may include selecting a part of an image where a face is detected (e.g., using the result of a face detection process), generating a three-dimensional model (e.g., mesh data) and texture model of the detected face, and comparing the three-dimensional model and texture model to templates of users. The templates may be generated in a configuration state using techniques described in more detail below.

A process to identity a face within a camera image may include using an eigenimage process. An eigenimage face recognition process may include selecting a part of an image where a face is detected (e.g., using the result of a face detection process), calculating a covariance matrix, calculating the eigenvectors and eigenvalues of the covariance matrix, performing principal component analysis to select the principal components and reduce the dimensionality of the eigenvectors and eigenvalues, comparing the resulting eigenimage data to a predefined eigenimage data set to generate a set of similarity measurements between the detected face and the faces in the predefined eigenimage data set, and performing statistical analysis to classify the eigenimage as a particular user's face. The statistical analysis may utilize data generated during a training process, performed in a configuration state using techniques described in more detail below. This disclosure is not limited to a particular face identification process and other techniques for identifying faces may be used.

The system may implement a process to identify parts of a camera image associated with a user. A user position may include a position of one or more user's hands. Alternatively, a user position may include a position of a user's body or a user's face. A user position may include a description of a user's shape (e.g., a silhouette or contour). A user position may include segmentation data which, for each pixel of a camera image, classifies a pixel as foreground (e.g., part of a user) or background, and a user position process may include a process to generate a segmented camera image.

A segmented camera image may be a chroma keyed camera image. A chroma keyed camera image may be acquired of a user who is standing in front of colored background. In some implementations, a chroma keying process identifies parts of a camera image whose color matches that of the background, and classifies those parts as background. Parts of a camera image whose color deviates from that of the background are likely to be parts of a user, and are classified as foreground.

A chroma keying process may include generating a color model of a background. A color model may define the range of colors representing a background. A chroma keying process may include comparing an image to a color model, and classifying each pixel as background if the pixel's color value falls within the range of colors indicated by the color model, and as foreground otherwise.

A chroma keying process further may include a filtering process to reduce noise and change the classification of small isolated clusters (e.g., to remove isolated parts of the background that may be classified as foreground, and fill holes in the foreground). A filter process may include a convolution kernel.

A segmented camera image may be a depth keyed camera image. A depth keyed camera image is typically acquired by a camera capable of determining range (e.g., a stereo camera or a time-of-flight camera). An example of a time-of-flight camera includes that produced by Canesta, whereby an infrared emitter emits a pulse of infrared light, and an optical sensor measures the time the light takes to travel to an object and back to the camera. The time-of-flight camera calculates the distance of the object based on the measured time.

An example of a stereo camera includes that produced by Tyzx, whereby a stereo camera includes multiple optical sensors that capture images of a scene from multiple viewpoints, and compares the multiple images to determine the disparity in the position of objects between the multiple viewpoints. The stereo camera calculates the distance of objects based on the determined disparity.

Parts of an image may be classified as foreground and background based on a distance of an object included in the part of the image. A classification process may include comparing the distance to a threshold, whereby parts are classified as foreground if the distance is shorter than the threshold, and parts are classified as background if the distance is longer than the threshold. For example, a classification process may include comparing the distance to a background model, whereby the background model represents the depth of parts of the scene (e.g., floor and furniture) without a user. In this example, the classification process may classify parts as foreground if the distance is shorter than the corresponding part of the model, and classify parts as background if the distance is equal or longer than the corresponding part of the model.

A depth keying process further may include a filtering process to reduce noise and change the classification of small isolated clusters (e.g., to remove isolated parts of the background that may be classified as foreground, and fill holes in the foreground). A filter process may include a convolution kernel.

A segmented camera image may be segmented using a background model. A chroma keyed camera image may be acquired of a user who is standing in front of an arbitrary stationary background. A camera image may be compared to a background model representing the expected appearance of the background. A background model may include a range of colors representing a background, for each part (e.g., pixel) of a background. A background color model may be acquired by storing an image of the scene without a user. Parts of a camera image may be classified as background if the color of that part is similar to the color of the corresponding part of the background color model. Parts of a camera image may be classified as foreground if the color of that part is dissimilar to the color of the corresponding part of the background color model.

A background segmentation process further may include a filtering process to reduce noise and change the classification of small isolated clusters (e.g., to remove isolated parts of the background that may be classified as foreground, and fill holes in the foreground). A filter process may include a convolution kernel. A background segmentation process further may include a learning process to update the background model to compensate for changes in the background or ambient light changes.

A segmented camera image may be segmented using a skin color model. A camera image may be compared to a skin color model representing the expected appearance of a user's skin. A skin color model may be predefined, and based on a sampled skin color in a large number of images of people. In some implementations, parts of a camera image are classified as foreground if the color of that part is similar to a color within the skin color model and parts of a camera image are classified as background if the color is dissimilar to any of the colors appearing in the skin color model.

A segmented camera image may be a motion image, whereby parts of the image including motion are classified as foreground, and parts of the image that appear static are classified as background. A process to segment a camera image by motion may include acquiring a sequence of camera images, calculating the difference between consecutive images, and comparing the difference to a threshold. A motion segmentation process further may include a filter process to reduce noise and change the classification of small isolated clusters (e.g., to remove isolated parts of the background that may be classified as foreground, and fill holes in the foreground). A filter process may include a convolution kernel.

A motion segmentation process further may include a motion history process. In some example, a motion history process stores a representation of time corresponding to a most recent occurrence of motion for each pixel. A motion history process may classify a pixel as foreground if the motion history reveals that motion has occurred within a time threshold for each pixel, and classify a pixel as background otherwise.

A process to refine a user position representing segmentation data into a user position corresponding to user's hand may include analyzing the shape of foreground parts of a segmented camera image. For example, a process may identify the top-most foreground parts (e.g., pixels), and calculate a user position as the position of the top-most foreground parts. Alternatively, analyzing the shape of foreground parts of a segmented camera image may include a process to generate a contour of foreground parts, a process to identify shape features of the contour, and a process to identify shape features as hands. A user position may be calculated as a hand position.

A process to determine a user position corresponding to a user's hand may include analyzing a camera image to identify a user's hand, and determine a position of a hand. A exemplary method of identifying a hand position within a camera image compares parts of the camera image to a skin color model representing the expected appearance of a user's skin. Parts of a camera image may be classified as skin if the color of that part is similar to a color within the skin color model. Parts classified as skin may be clustered into clusters of parts, and clusters of parts whose overall position and size meets one or more criteria are classified as hands. This disclosure is not limited to a particular method of identifying a hand position within a camera image and other hand tracking methods may be employed.

Returning to FIG. 4, when a gesture is recognized, a user interface including a control and a representation of the user is provided (S404). A representation of a user may be displayed to minimize training and skill required to interact with an interface. A representation of a user may facilitate a user to easily recognize their hand position relative to onscreen item positions, and easily move their hand position to be coincident to an item position. A representation of a user may be, for example, an avatar or a mouse cursor.

When a user interface is provided, the representation is caused to interact with the control based on the recognized gesture (S406). For example, a button or item that is adjacent to the user representation (e.g., adjacent to a mouse cursor, or adjacent to a hand of an avatar) may be selected.

Based on the interaction of the representation with the user interface control, a telecommunication session is controlled (S408), thereby ending the process 400 (S410). For example, an incoming call may be accepted or denied, voicemail messages may be played, or a phone number or contact may be dialed, to name a few examples.

Figure 5:
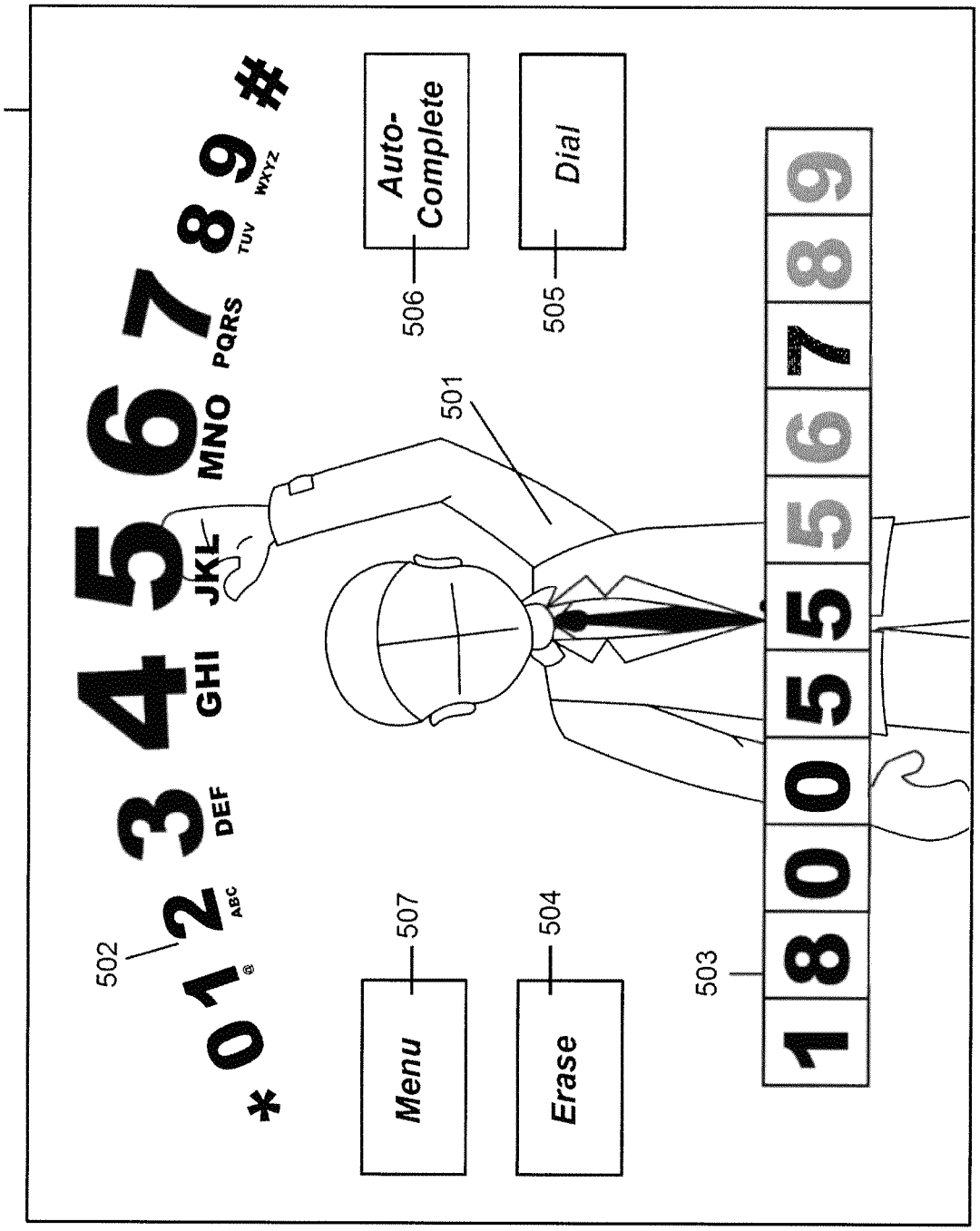
FIGS. 5 to 7 illustrate examples of interfaces including a representation of a user.

FIG. 5 illustrates an example user interface 500. The user interface 500 includes a user representation 501. The user interface 500 may include a set of foreground graphics, such as representations of items 502, text 503, and buttons 504, 505, 506, and 507, some of which may be rendered over the user representation 501, partially occluding the user representation 501.

Displaying the user interface 500 may include blending a camera image with a second image. A second image may include an image generated by an application, a video game image, a television image, etc. Blending a camera image may include, for each pixel of a user interface, combining a camera image pixel value and a second image pixel value. As shown below, Equation (1) may be used in blending a camera image with a second image, where D represents the result, C represents the camera image, S represents the second image, x and y reference a pixel position within the images, and α represents a blending proportion of the range 0 to 1:

$$D(x,y)=\alpha \cdot C(x,y)+(1-\alpha)\cdot S(x,y) \quad (1)$$

Figure 6:
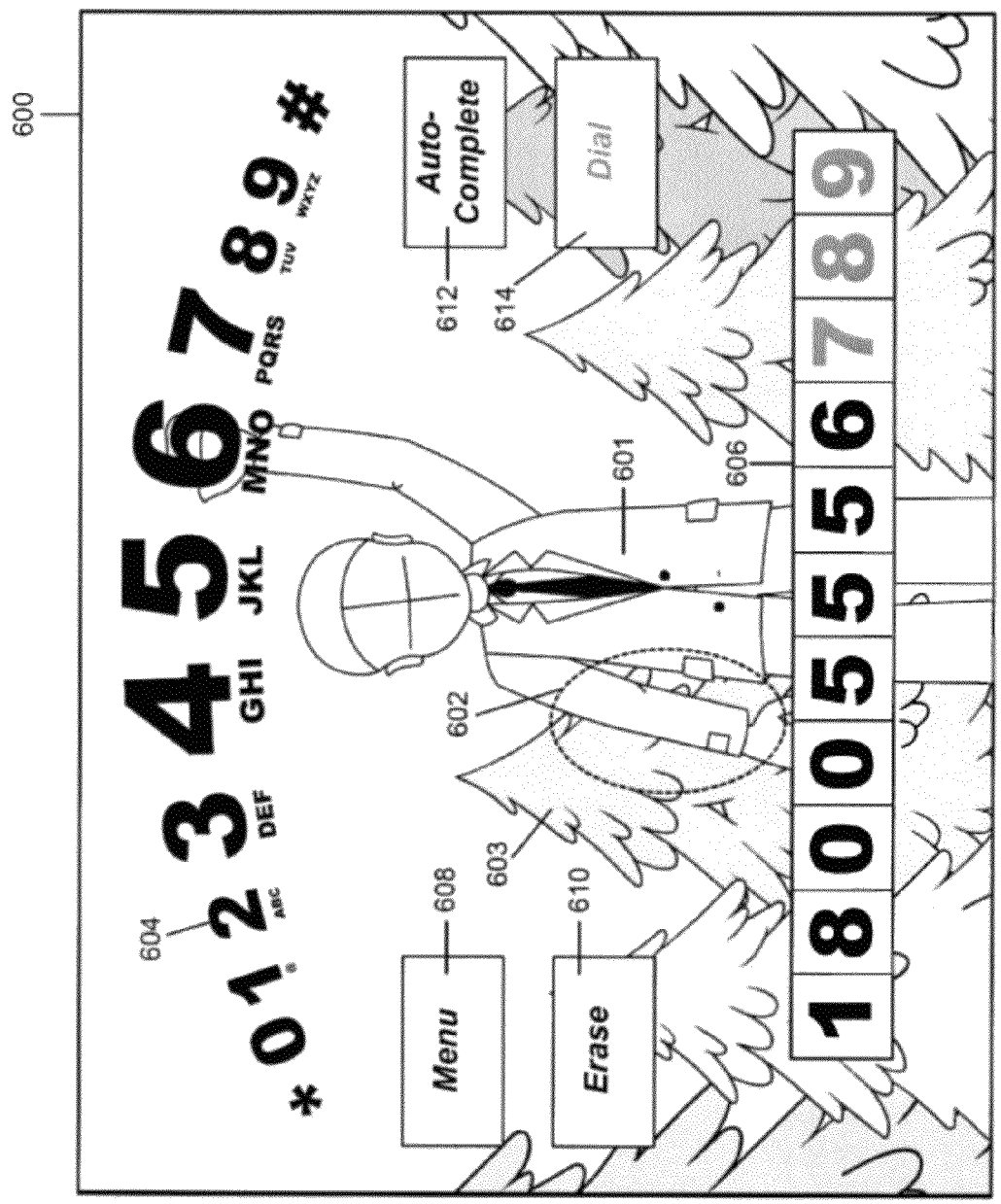

FIG. 6 illustrates another example of a user interface 600 including a user representation 601. An implementation of displaying a representation of a user may include displaying a segmented image, where the image is segmented into foreground and background parts. In some implementations, parts (e.g., pixels, areas, blocks, points or regions) of the image likely to be part of the user representation are classified as foreground, and parts unlikely to be part of the user representation are classified as background.

Displaying a segmented image may include rendering only the parts classified as foreground. An implementation of rendering only parts classified as foreground may include generating an alpha channel representing opacity, where foreground parts are defined as opaque and background parts are defined as transparent. In this implementation, the user representation 601 may be combined with a set of background graphics using the alpha channel, such that the user representation 601 occludes (for example, in area 602) the background graphics 603. A set of foreground graphics, including representations of items 604, text 606, and buttons 608, 610, 612, and 614, may be rendered over the combined user representation 601 and background graphics, partially occluding the user representation 601 and background graphics. Additional foreground and background graphics may be generated by an application.

Figure 7:
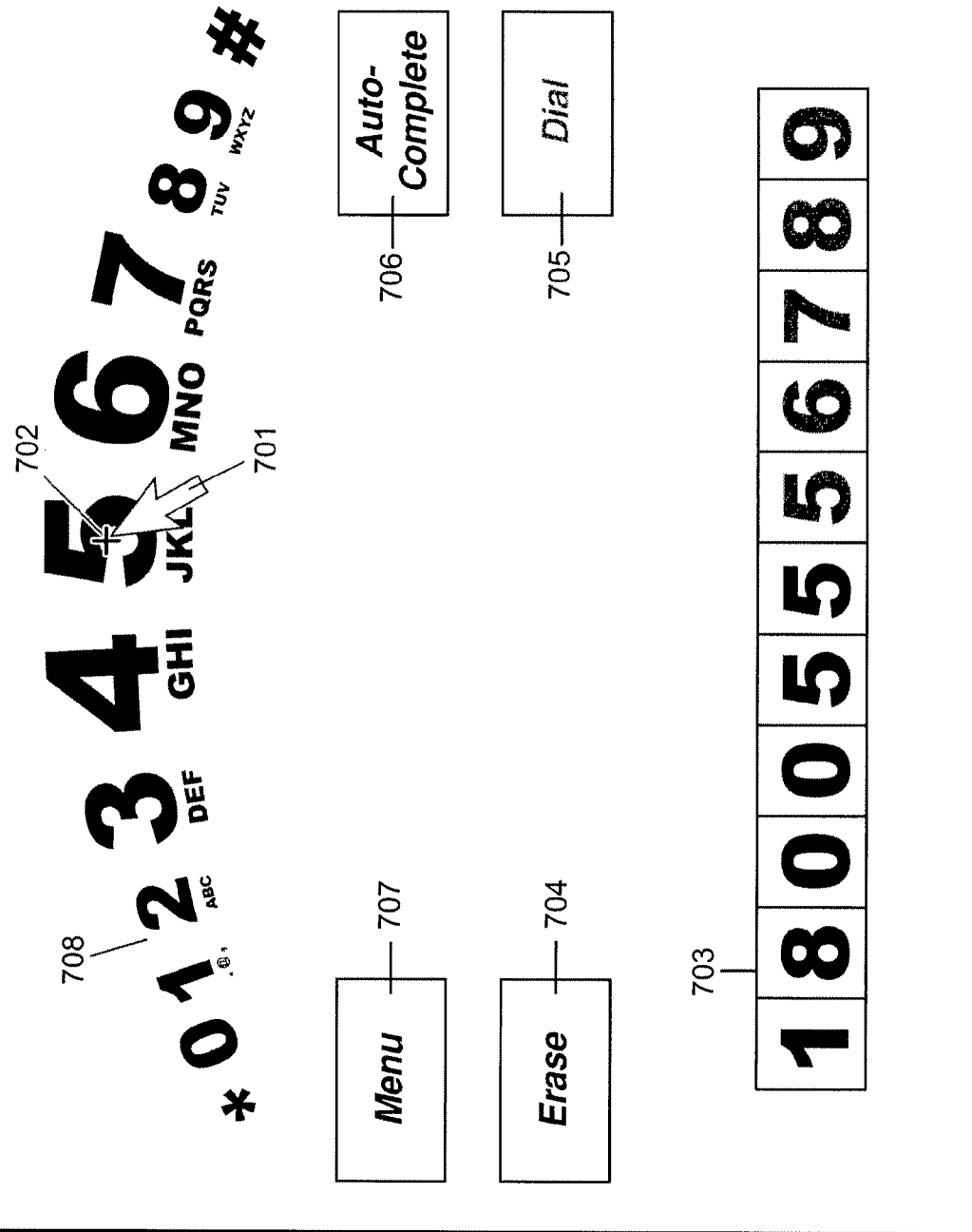

FIG. 7 illustrates a further example of a user interface 700 including a user representation 701. An implementation of displaying a representation of a user may include displaying a computer generated image, such as a computer mouse cursor or graphical representation of a hand. As shown in FIG. 7, a position of a computer generated image 701 may correspond to a user position 702 and may be a representation of the user.

An implementation of displaying a representation of a user may include displaying a preview of outgoing video (e.g., in a video conference call). Other representations of a user may be displayed to assist a user in interacting with an interface. A representation of motion (e.g., past motion or motion history) of a user may be displayed to assist a user in interacting with an interface.

The system may implement a process to detect when a user touches foreground graphics, such as buttons. A user may touch a foreground graphic when a representation of a user, or a portion of the representation occupies, points to, or is adjacent to a position within a user interface that is coincident to a position occupied by a foreground graphic.

Figure 8:
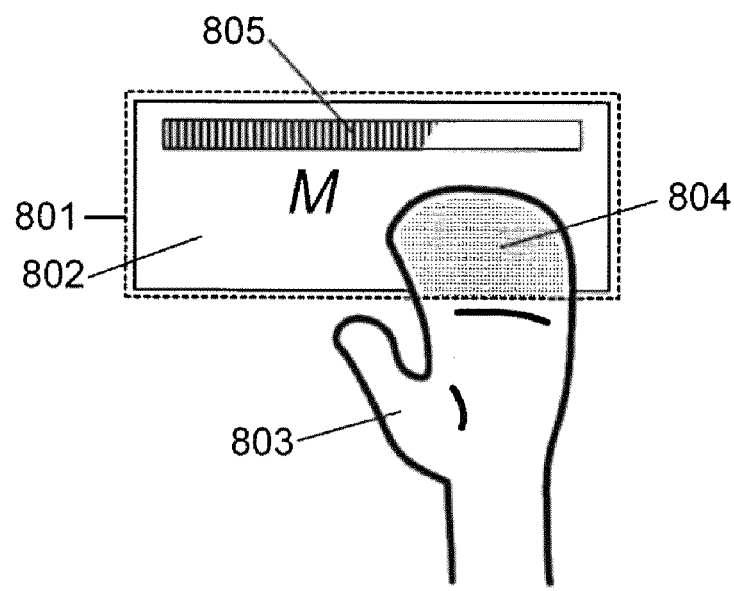
FIGS. 8 and 9 illustrate examples of a representation of a user touching a graphic.

FIG. 8 illustrates an example of a representation of a user touching a graphic. A process to determine a user touch may include analyzing a segmented camera image, where a camera image is segmented into foreground and background parts. Referring to FIG. 8, parts (e.g., pixels) of the image likely to represent the user may be classified as foreground 803, and parts (e.g., pixels) unlikely to represent the user may be classified as background. A region 801 may be defined such that the region 801 represents a size and position of an interactive foreground graphic, such as a button 802. The process may determine the parts (e.g., pixels) of the segmented camera image that are within a region (e.g., within region 801), shown as the shaded area 804. A process to determine a touch using a segmented camera image may include counting the number of foreground parts (e.g., pixels) within the region 801, comparing the count to a threshold, and classifying the region as touched if the count is greater than the threshold.

In some implementations, a process of determining a user position using a segmented camera image may include accumulating the count of the number of foreground parts (e.g., pixels) within the region 801 over a period of time. For each video frame, a predefined number may be removed from the accumulated count, to a minimum of zero, and the current count may be added to the accumulated count, to a maximum of a threshold. The region may be classified as touched when the accumulated count reaches the threshold. The foreground graphic may include a representation of the accumulated count relative to a threshold in order to provide visual feedback to the user. For example, the graphic may include a bar or pie graph 805, or may be rendered in a color or size that is dependent on the accumulated count.

Figure 9:
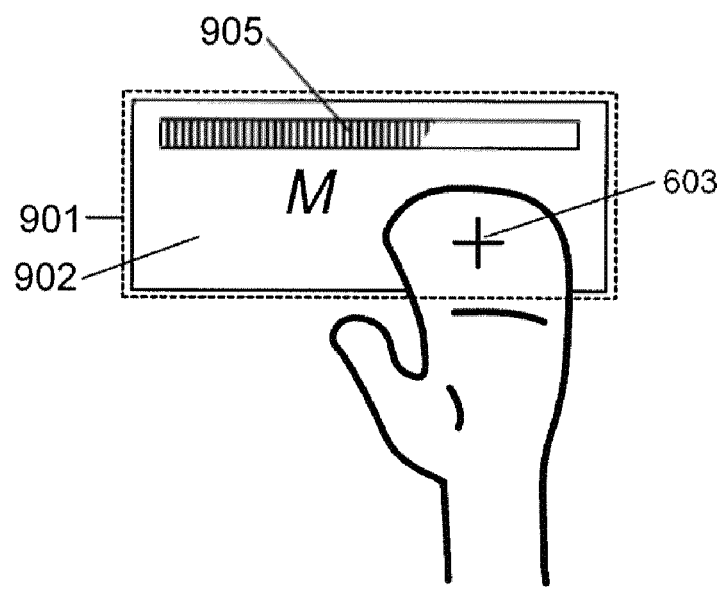

FIG. 9 illustrates another example of a representation of a user touching a graphic. A process to determine a user touch may include comparing a user position to a region. Referring to FIG. 9, a region 901 may be defined such that the region 901 represents a size and position of an interactive foreground graphic, such as a button 902. A process of determining a touch using a user position may include classifying the region 901 as touched if a user position 903 is within the region 901.

In some implementations, a process of determining a user position using a segmented camera image may include counting the number of video frames or amount of time in which a user position is within a region. For each video frame, the count may be incremented (to a maximum of a threshold) if a user position is determined to be within a region, and the count may be decremented (to a minimum of zero) if the user position is not within the region. The region may be classified as touched when the accumulated count reaches the threshold. The foreground graphic may include a representation of the accumulated count relative to a threshold in order to provide visual feedback to the user. For example, the graphic may include a bar or pie graph 905, or may be rendered in a color or size that is dependent on the accumulated count.

The system may implement an enhanced user interface process facilitating the user selection of items. Items may include text and numbers, whereby the enhanced user interface process facilitates the entering of text and numbers.

Figure 10:
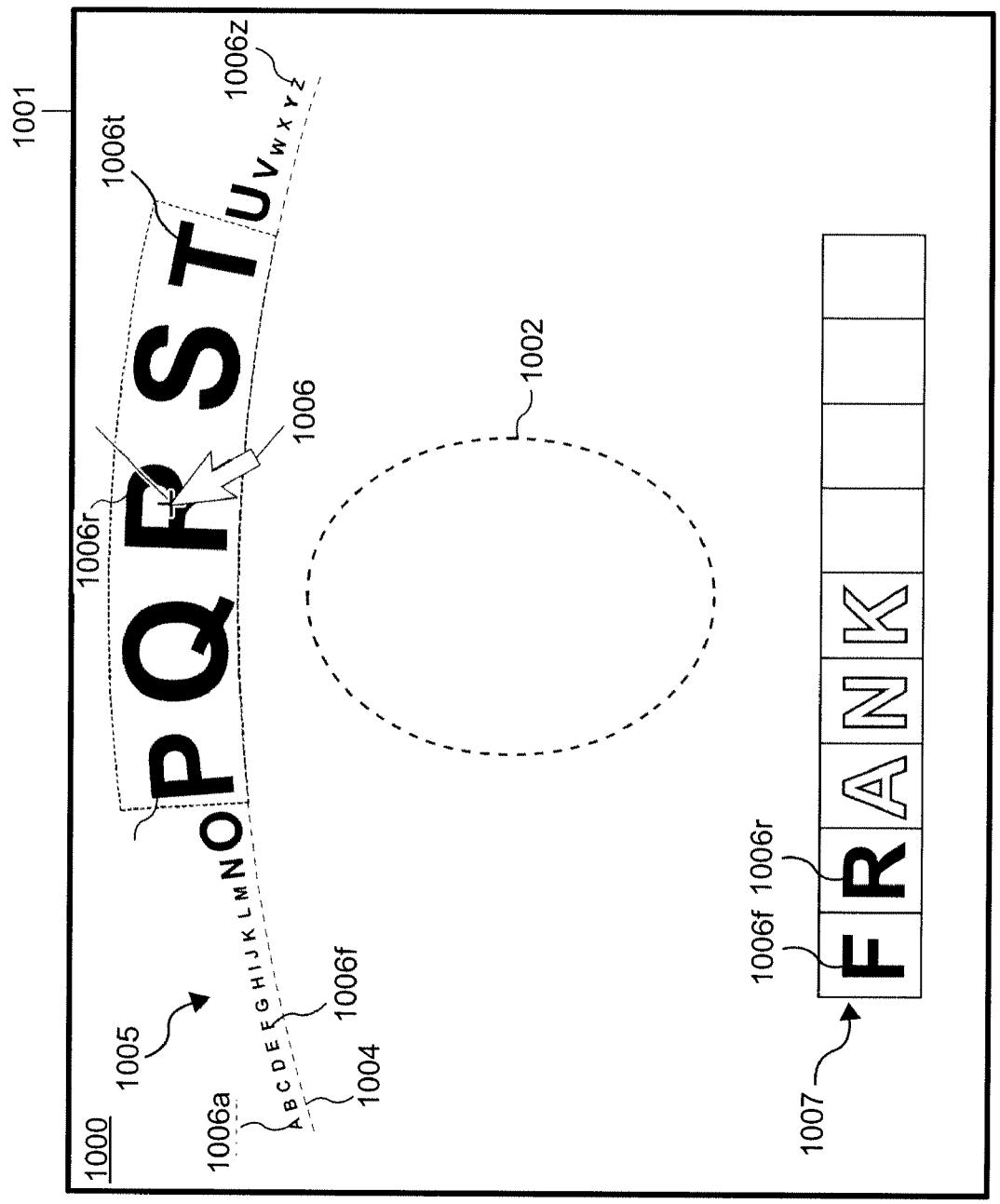
FIG. 10 illustrates an example of an interface for selecting items.

FIG. 10 illustrates a user interface 1001 that includes an object 1002, such as an icon or an avatar (depicted as a dashed circle), and a control 1005 that further includes a guide line 1004. Although the guide line 1004 is illustrated as a dashed line in FIG. 10, in other example implementations the guide line 1004 is depicted as a solid line, or is not depicted at all.

The control 1005 allows for the intuitive selection or output of items, such as letters 1006, while at the same time allowing for the display of a portion or the entirety of the object 1002 in a region adjacent to, near, partially or completely bounded or surrounded by, or otherwise defined by the guide line 1004. When it is determined that the items are to be output or selected, such as when a user selects an input field that calls for the entry of text data, the control 1005 is positioned in a location in the user interface 1001 that allows for the display of the items 1006 and the object 1002, and is thus defined relative to, in relation to, based on, or with regard to the object 1002. Put another way, the position of the object 1002 may represent an anchor position, in relation to which the guide line 1004 and other elements of the control 1005 may be oriented or aligned, or with respect to which the other elements may be positioned.

In order to determine this anchor position, the object by which the guide line 1004 is to be defined, and the position of that object, are determined. In some cases, the object may be predetermined or predefined, such as where the control 1005 is output in conjunction with or includes an avatar, image of a user, knob, icon, list, table of data, graph of data, text entry field, another control or widget, or known blank region of the user interface 1001. In other cases, the object is dynamically determined at the time when the control 1005 is to be output, such as where the user tabs to a text field and the text field is used as the object, where a blank region of the user interface 1001 is located based on the current state of the user interface 1001, where a biggest, predominant, most or least colorful object on the screen is dynamically determined to be the object, or where an in-focus element, region or window is dynamically determined to be the object.

In these and other cases, the size, shape, position, boundaries or other contexts of the object 1002 are detected, and the guide line 1004 is defined in relationship to these detected contexts. For instance, the guide line 1004 may be defined to have an overlapping or non-overlapping relationship with the object or a portion of the object, a bisecting relationship, a dividing relationship, a space constrained or limited relationship, or any other relationship, such as a relationship based on size, shape, proportion, or an anatomical model of the object 1002.

In summary, and among other things, the user interface 1001 includes an object 1002, which may be a representation of the user, and items 1006 that make up a set of items. The items 1006 may be displayed in a dynamic fashion, such that the items 1006 are displayed in a size and position that permits the user to conveniently and reliably select each item. Since it may otherwise not have been possible to fit each of the items 1006 within the user interface 1001 or aligned with the guide line 1004 in a large size, a subset of the items 1006 may be rendered in that larger size.

Figure 11:
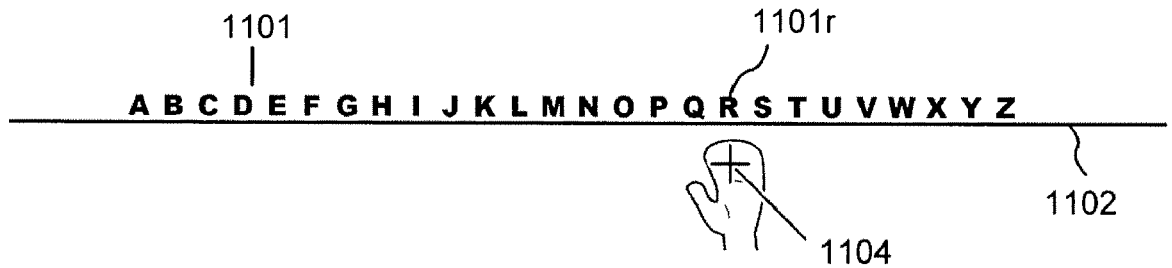
FIGS. 11 to 29 illustrate the exemplary selection of an item aligned along a guide line.

FIGS. 11 to 15 illustrate the exemplary selection of a particular item from a set of items aligned along a guide line. In FIG. 11, a set of items 1101 is aligned along a guide line 1102. A cursor 1104, which is mapped to and depicted as a hand of an avatar, moves toward an item of interest 1101r.

Figure 12:
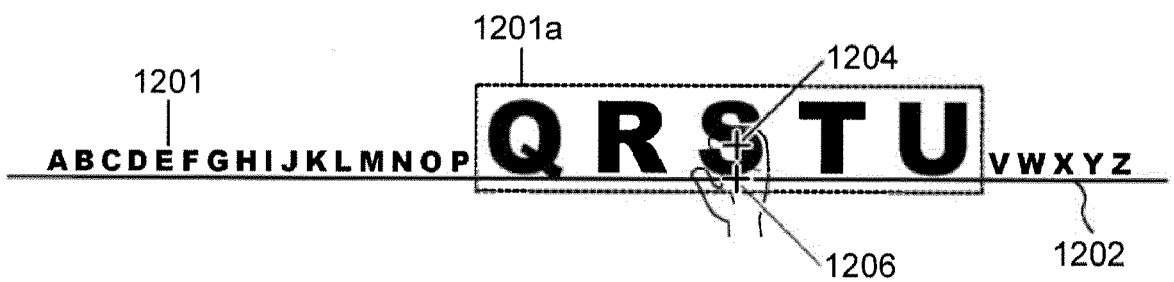

In FIG. 12, the position of a cursor 1204 crosses a guide line 1202. The crossing of the guide line 1202 may initiate a further detection process which selects or identifies a subset 1201a of items 1201 based on a distance between each item and the cursor 1204. The position of the cursor 1204 is determined based on the position of the user's hand in the space around their body, as detected in a camera image.

The subset 1201a of the items 1201 are displayed in a larger size or scale of font, facilitating easier or more intuitive selection by the user. Selection of the subset 1201a of the items 1201 and the enlarging of the display of the subset 1201a of the items 1201 may occur in response to detecting that the cursor 1204 has crossed the guide line 1202, or may occur irrespective of the position of the cursor 1204 relative to the guide line 1202. Upon detecting that the cursor 1204 crosses the guide line 1202 at base position 1206 or that an item has been selected, user feedback may be generated, including for instance sound, imagery, flashing lights, and/or tactile output such as a vibration.

Figure 13:
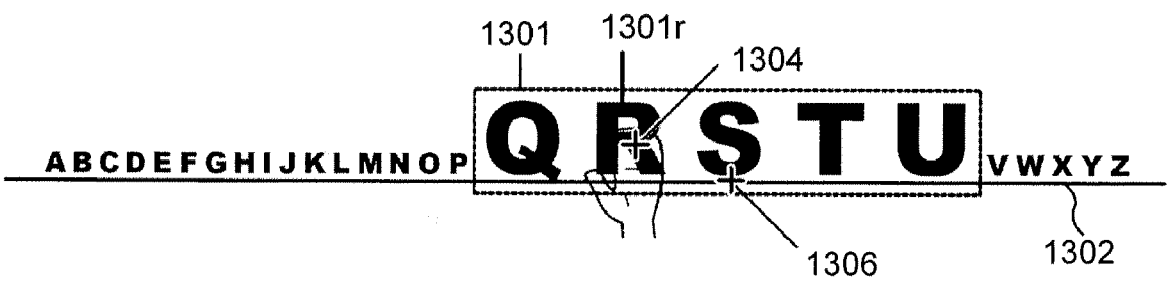

The user selects an item of interest 1301r in FIG. 13. Highlighting a subset of items 1301 permits the user to select a general area containing the item of interest 1301r, to "zoom in" on items within that area, and to reliably and conveniently select the item of interest 1301r, which represents the letter "R." Selection may occur using mouse events, keyboard or keypad strokes, gesture recognition, camera-based inputs, or through many other approaches.

Figure 14:
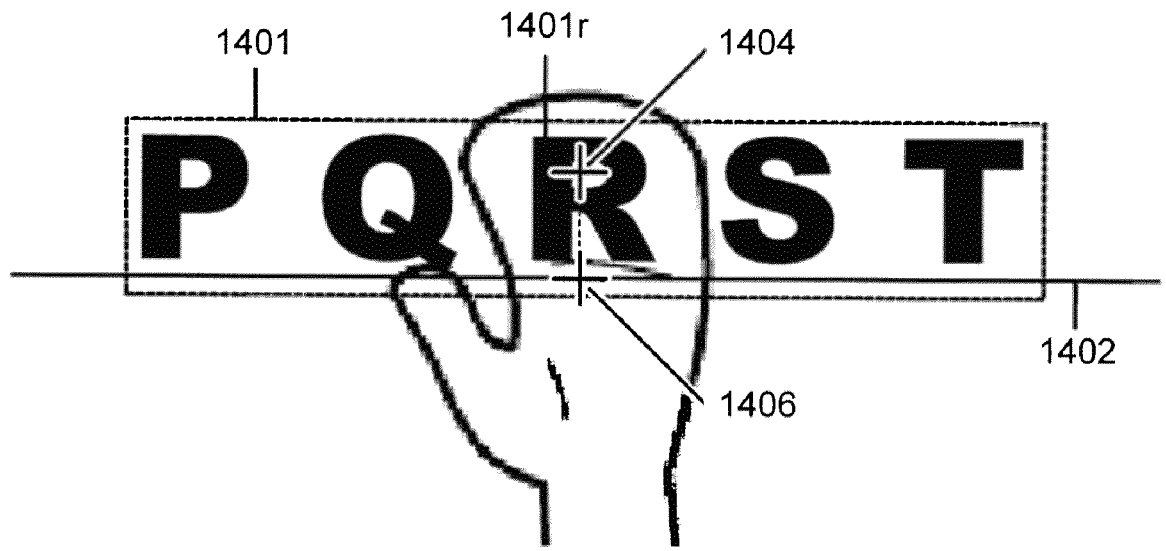

The location of a base position 1306, representing the position where a cursor 1304 has crossed a guide line 1302, may be detected in many ways. For instance, and as shown in FIG. 14, the location of a base position 1406 may be determined as a position on a guide line 1401 nearest to a cursor 1404 observed at a time after the cursor 1404 is detected above the guide line 1401, or nearest to a highlighted item such as item 1401r.

Figure 15:
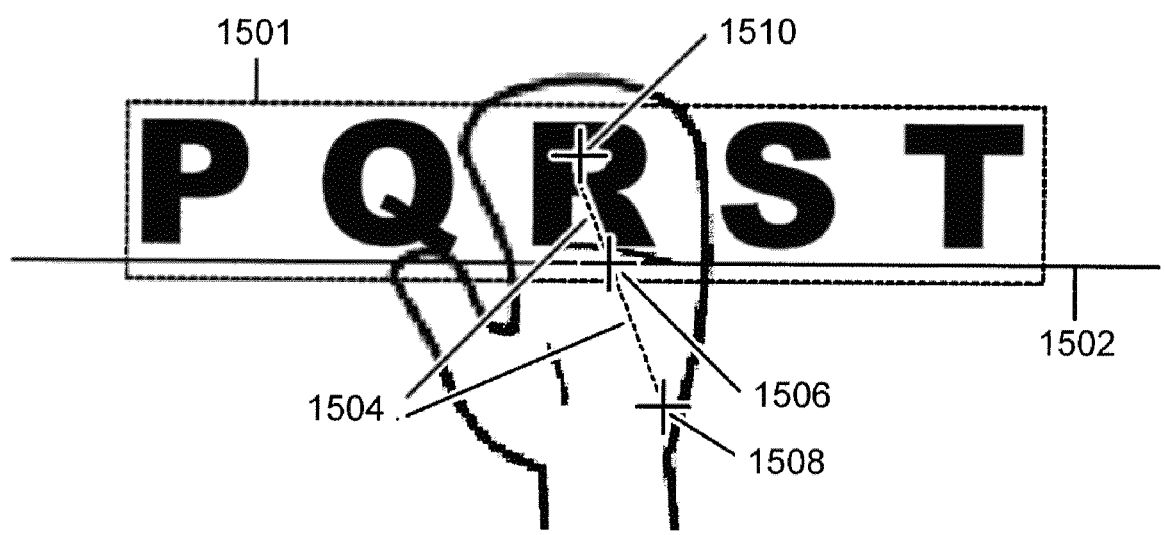

The base position may be detected using other approaches as well. For instance, the location of the base position 1406 may be detected as the cursor 1404 crosses the guide line 1401, or using positions of the cursor 1404 at times before and after the crossing of the guide line 1401. FIG. 15, for instance, illustrates endpoint 1508, representing a position of a cursor observed at a time prior to crossing a guide line 1502, and endpoint 1510, representing a position of the cursor observed at a time after crossing the guide line 1502. A base position 1506 may be determined as the intersection of the line segment 1504 defined by the endpoints 1508 and 1510, and a guide line 1501.

Returning to FIG. 12, highlighting the subset 1201a of the items 1201 may include determining a position along the guide line 1202 corresponding to the items that make up the subset 1201a. In some implementations, items positioned in proximity to the base position 1206 are selected to be part of the subset 1201a of the items 1201 to be highlighted (e.g. displayed in a large size), such that items near the base position 1206 remain in or near their original, non-highlighted positions, and items further away from the base position 1206 move outwards to accommodate for the increase in size of the subset 1201a of the items 1201.

Equation (2), below, may be used to determine the position of items that are not within the subset 1201a after the subset 1201a has been highlighted.

$$X'_i = X_b + (X_i - X_b) \cdot \left(\frac{S'_i}{S_i}\right) \quad (2)$$

Figure 16:
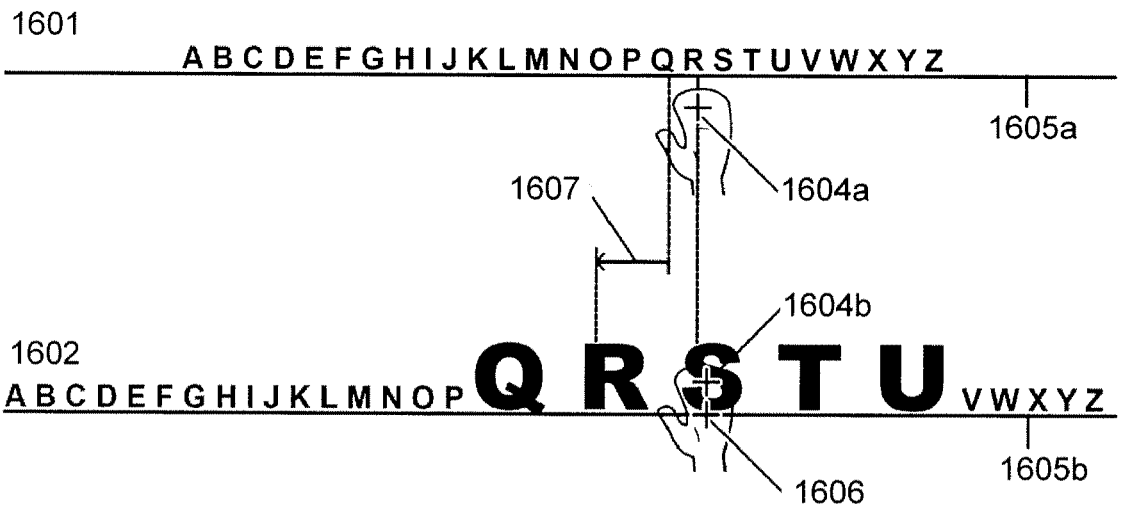

In Equation (2), $X_i$ represents the position of item i along the guide line, in the original state; $X'_i$ represents the position of item i along the guide line, in the enlarged state; $X_b$ represents the base position along the guide line; $S_i$ represents the base size of item i in the original state; and $S'_i$ represents the size of item i in the enlarged state FIG. 16 illustrates a subset of items in a first state 1601 prior to the highlighting of a subset of items, and in a second state 1602 after the highlighting of the subset of items. For example, if a cursor 1604 initially crosses a guide line 1605 under the item "S" (such that a base position 1606 is coincident to the item "S"), the item "S" remains in its original position and the item "R" is displaced by distance 1607 towards the left relative to its original position. The second state 1602 thus demonstrates the items' scaled size and position following highlighting.

Figure 17:
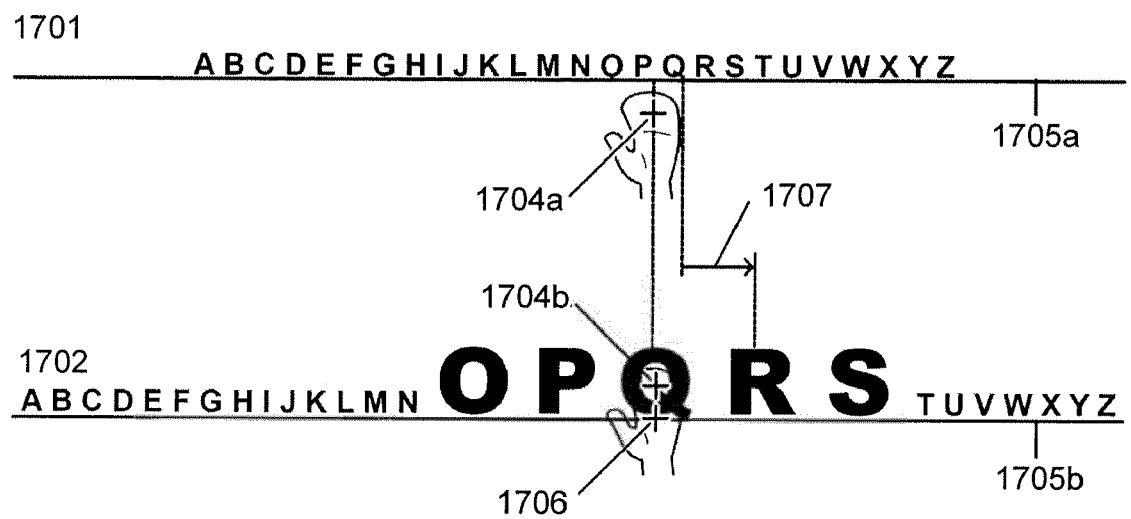

FIG. 17 illustrates a subset of items in a first state 1701 prior to the highlighting of a subset of items, and in a second state 1702 after the highlighting of the subset of items. For example, if a cursor 1704 crosses a guide line 1705 under the item "Q" (such that a base position 1706 is coincident to the item "Q"), the item "Q" will remain in its original position and the item "R" is displaced distance 1707 towards the right relative to its original position. The second state 1702 thus demonstrates the scaled items following highlighting. Accordingly, the position of the cursor 1704 used to select a particular item may be dependent on the position where the cursor 1704 initially crossed the guide line 1705.

Figure 18:
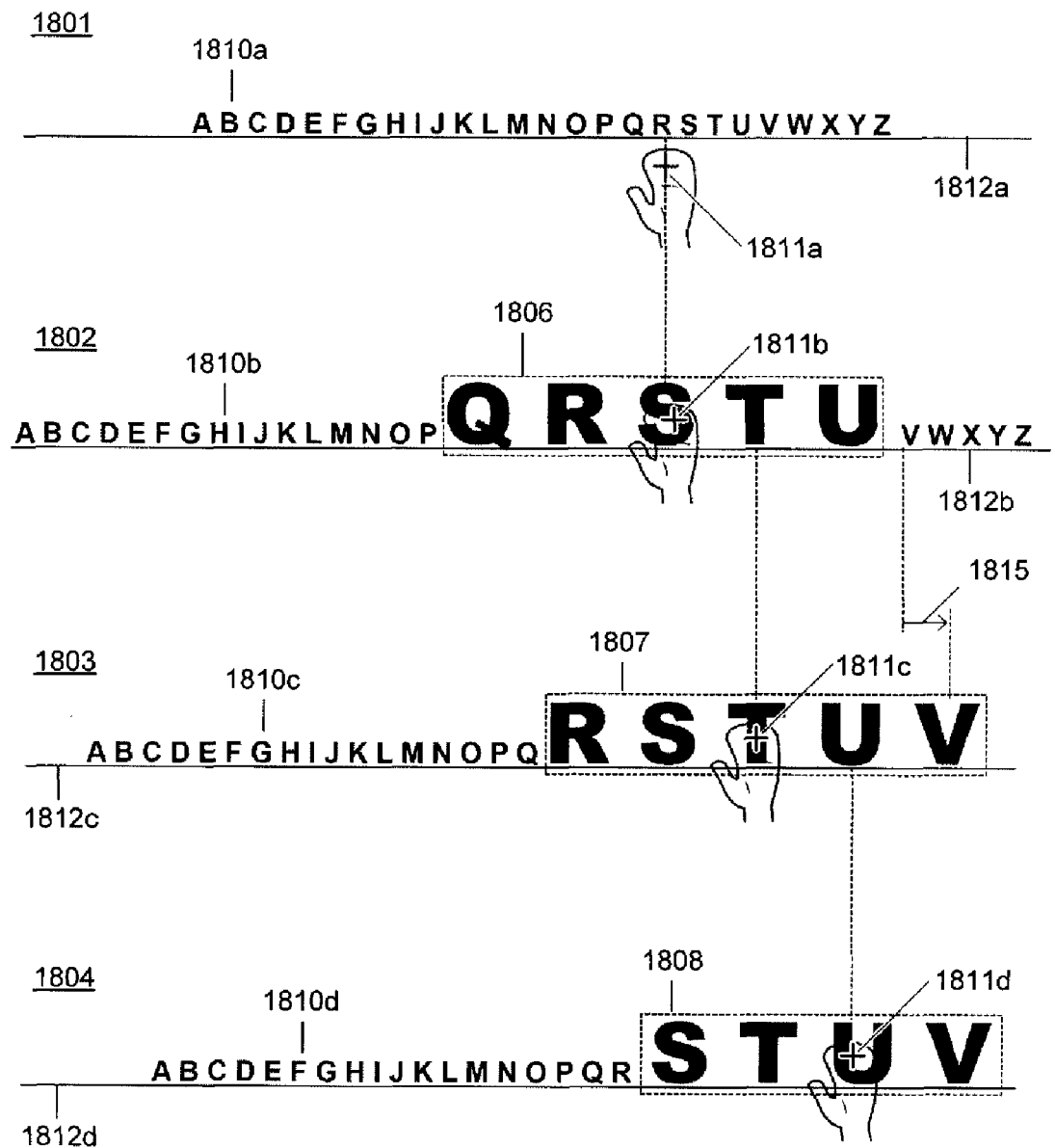

FIG. 18 illustrates a subset of items in states 1801 to 1804 associated with the highlighting of a subset of items. Specifically, FIG. 18 shows an overview of the selection and highlighting of first through third subsets 1806 to 1808 of items 1810*a*-*c*, respectively. The second and third subsets 1807 and 1808 may be positioned according to the position of a cursor 1811 relative to first and second subsets 1806 and 1807, respectively.

In state 1801, the items 1810*a* reflect their original, non-highlighted size and position. In state 1802, the first subset 1806 of the items 1810*b* has been selected and highlighted. In state 1803, the second subset 1807 of the items 1810*c* has been selected and highlighted. In state 1804, the third subset 1808 of the items 1810*d* has been selected and highlighted.

In state 1802, the cursor 1811*a* initially crosses the guide line 1812*a* under the item "S" (such that the base position is coincident to the item "S"), the item "S" remains in its original position, and the surrounding letters are displaced outwards from their original positions. Transitioning from state 1802 to state 1803, if the cursor 1811*b* moves to the right, the second subset 1807 of the items 1810*c* within a distance of the cursor 1811*c* is selected. In the state 1803, if the cursor 1811*c* moves along the guide line 1812*c* to be coincident to the enlarged item "T", the item "T" remains in its enlarged position and the item "V" is highlighted moved distance 1815 further towards the right along the guide line 1812*c*.

If insufficient space exists on the guide line 1812*c* for certain items, such as items "W" through "Z," the items are "pushed off" the end of the guide line, and are not displayed. Transitioning from the state 1803 to the state 1804, if the cursor 1811*c* continues to move further towards the right end of the guide line 1812*c*, there may also be insufficient space to display additional items that are part of the second subset 1807, and the third subset 1808 may be formed (as a subset of the second subset 1807).

In order to select an item on the right portion of the second subset 1807 such as the item "U," or an item that has been "pushed off" the end of the guide lines such as the items "W" to "Z," the user may re-cross the guide line 1812*c* with the cursor 1811*c*, and cross the guide line 1812*c* a third time to establish a new base position nearer to the desired item. Furthermore, instead of "pushing off" items to the right end of the guide line 1812*c*, items on the left end of the guide line may be "pushed off" instead to accommodate for the display of items that would otherwise be "pushed off" of the right end. In some implementations, instead of "pushing off" items, items may be decreased in size according to the available space on a guide line so that all items are displayed on a guide line.

In other implementations, items "pushed off" the right end of the guide line may re-appear on the left end of the guide line. In implementations utilizing a continuous (e.g. circular) guide line, items may be pushed around the guide line. Therefore, in an example of a circular guide line where a user may move a cursor clockwise around a continuous guideline, items excluded from the current subset of items may flow clockwise at a lesser angular velocity than the cursor (as they make room for items to grow as they are added to the subset). In this example, a cursor may move multiple revolutions around a guide line for one revolution of an item around the guide line.

Scrolling may be used to facilitate a selection of items that would otherwise have been pushed off an end of a guide line. Scrolling may include, for example, detecting if the cursor 1811*c* is within a predefined distance of an end of a guide line 1812*c*, and applying a velocity to item positions. Where item positions are calculated relative to a base position (see Equation (1), above), the velocity may be applied to the base position, and items may be displaced accordingly.

Figure 19:
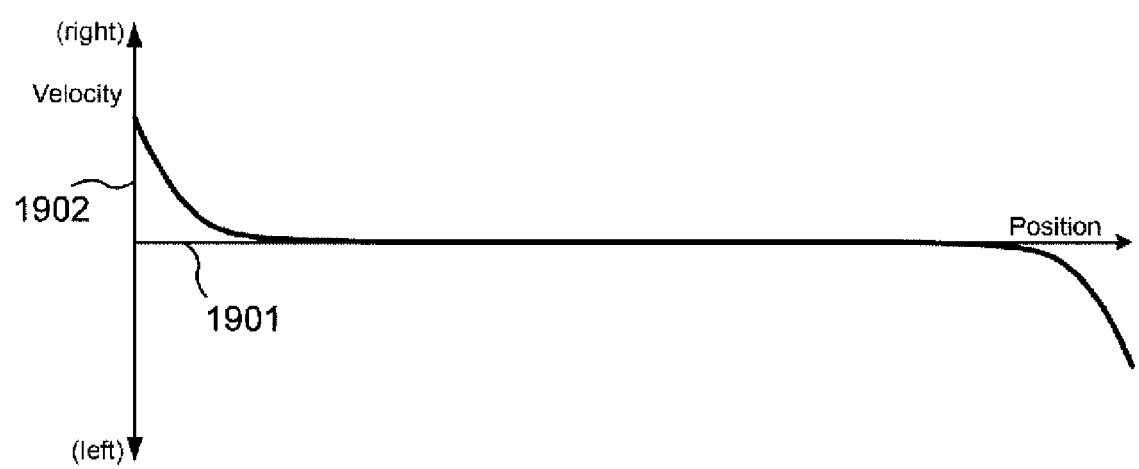

FIG. 19 illustrates an exemplary velocity function, in which the horizontal axis 1901 represents positions along a guide line, and the vertical axis 1902 represents velocity. Using this velocity function, items are moved or shifted by applying a velocity when a cursor position is near an end of the guide line, and items are not moved or shifted (since the velocity is zero) when the cursor position is at the center of the guide line.

Figure 20:
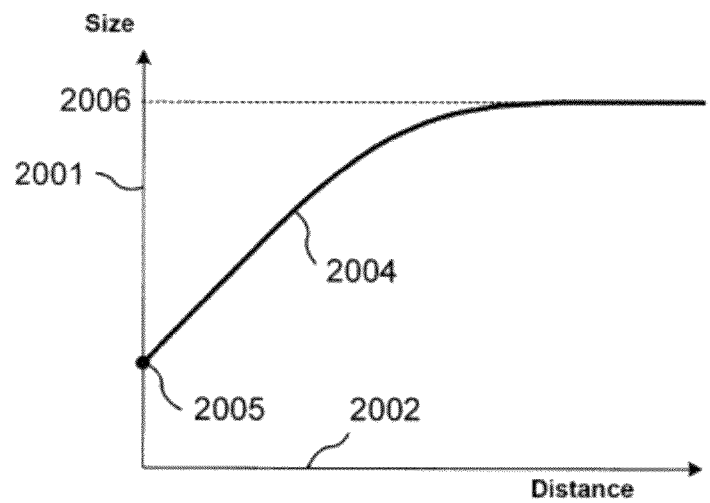

FIG. 20 illustrates an exemplary scaling function which may be used to scale the size of an item (reflected by vertical axis 2001) in a subset of items based on a distance (reflected by horizontal axis 2002) between the position of a cursor relative to a guide line. As represented by the curve 2004, the size of an item ($Si'$) may thus be a function of the current position of a cursor. A base size ($Si$) associated with non-highlighted items or all items if the cursor has not crossed the guide line is determined by referencing point 2005, and line 2006 defines a maximum size associated with a highlighted item.

In one example implementation, the slope of the curve 2004 is approximately 1:1 near the point 2005, so that item sizes appears to grow linearly and proportionally as the proximity to the cursor decreases. Growth of the item may begin to taper off near the maximum size, to produce an aesthetically pleasing transition as the cursor becomes increasingly proximate to a highlighted item.

Figure 21:
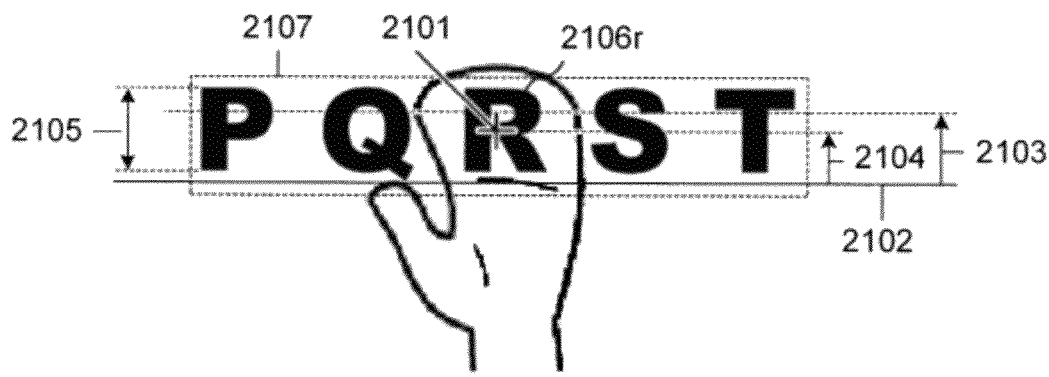
Figure 22:
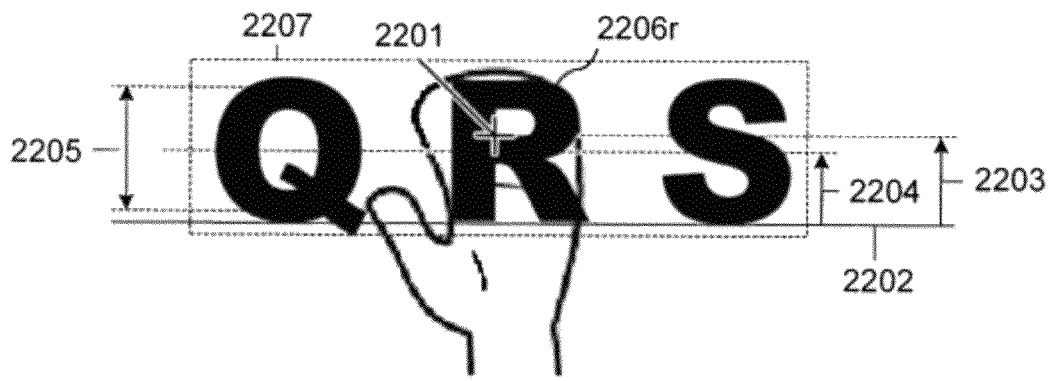

FIGS. 21 and 22 illustrate the use of a scaling feature by an enhanced control, for example, when a cursor 2101 crosses a guide line 2102. A height 2104 represents a distance between the position of the cursor 2101 and the guide line 2102, and a height 2105 represents a size of items, such as item 2106*r*, in a subset 2107. The height 2105 of items in the subset 2107 is scaled based on the height 2104, making items appear larger in FIG. 21, where the cursor 2101 has crossed the guide line 2102 by a small amount, than in FIG. 22, where a cursor 2201 has crossed a guide line 2202 by a smaller amount. As above, the position of the cursor 2101 may be determined using camera-based input.

Figure 23:
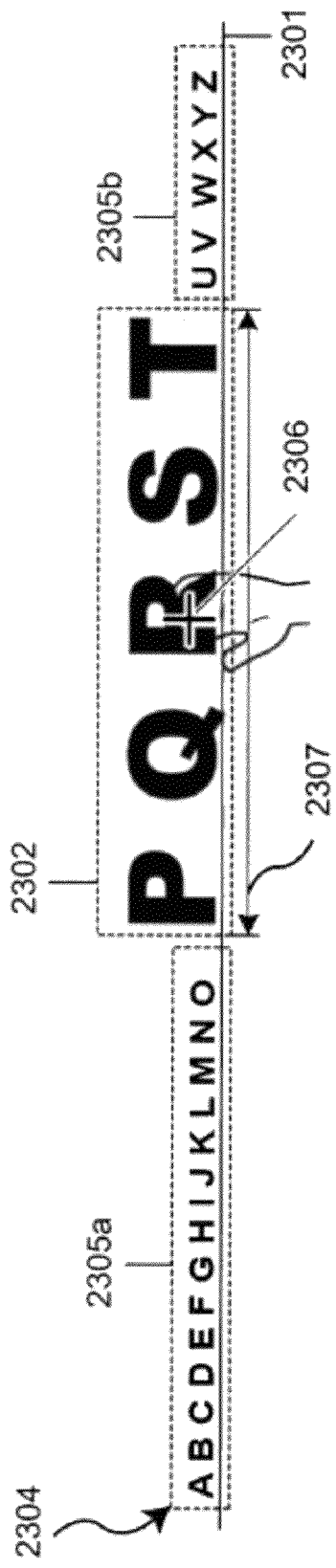
Figure 24:
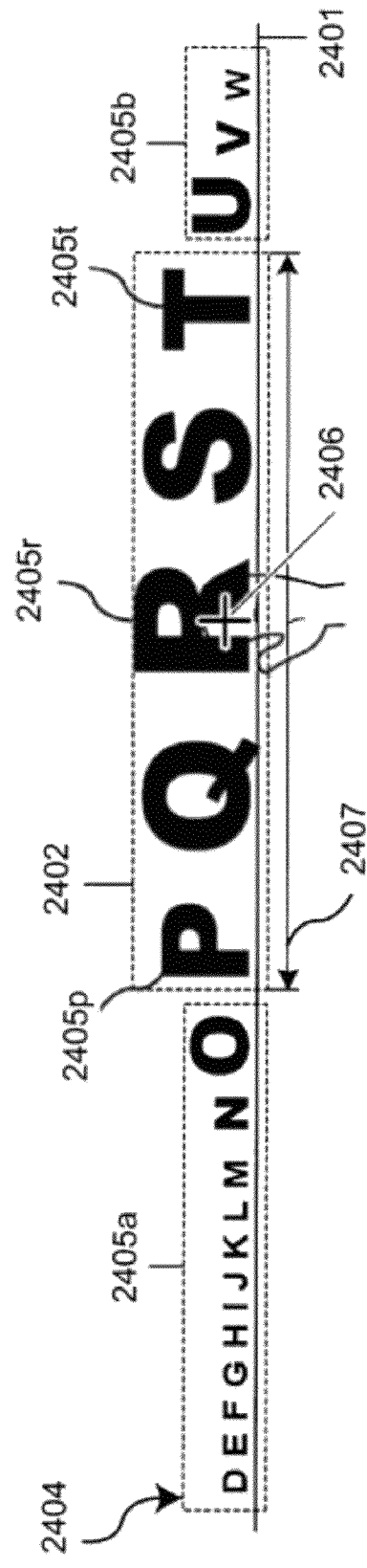

FIGS. 23 and 24 illustrate exemplary guide lines in which a subset of items is highlighted. Specifically, FIG. 23 illustrates an exemplary guide line 2301 in which a subset 2302 of items 2304 is displayed in an enlarged manner. Selecting the subset 2302 of items 2304 may include selecting a predefined number of items, or dynamically selecting a number of items to include within the subset 2302 based on the size of the items.

The number of items to include in the subset 2302 may be dynamically selected so that the items of subset 2302 span the entire length 2307 of the guide line 2301, or they may span a portion of the guide line 2301. As shown in FIG. 23, items 2305*a* and 2305*b* that are excluded from the subset 2302 may also be displayed along the guide line 2301. The number of items in the subset 2302 may also change based on the size of the items within the subset, for example where subset 2107 (in FIG. 21) displays five items, and subset 2207 (in FIG. 22) displays three items, even though the width of the subset 2107 and the width of the subset 2207 are the same.

Highlighting items by displaying the items of a subset at a large size may include displaying all of the highlighted items at the same large size, as illustrated in FIG. 23, or by displaying individual items within a subset at a size that is dependent on its position along the guide line relative to a cursor position, as illustrated in FIG. 24.

FIG. 24 illustrates an exemplary guide line 2401 in which a subset 2402 of items 2404 is displayed with a varying item size. For example, the size of items 2405p and 2405t at the ends of the subset 2402 (representing letters "P" and "T," respectively), may be sized smaller than the item or items at the center of the subset 2402, such as the item 2405r (representing the letter "R"). Displaying items in the subset 2402 with varying sizes may produce a pleasing aesthetic appearance and may make use of the enhanced control more intuitive. As shown in FIG. 24, items 2405a and 2405b that are excluded from the subset 2402 may also be displayed along the guide line 2401.

Displaying the items of the subsets 2302 and 2402 at a large size may include animating the items. An animation may include enlarging the items of the subset and translating the position of items along the guide line (e.g., keeping the items perpendicular to the guide line) over a short period of time. Items that are excluded from the subsets 2302 and 2402 may be animated to shrink in size and move outwards along the guide line, in order to "make room" for the subsets 2302 and 2402.

Items that are "pushed off" from the ends of a guide line may simply disappear, or may be animated to fall off the edge of the guide line or to be destroyed in a visually stimulating or humorous manner, such as by combustion, implosion, vaporization, explosion, liquefaction, crushing, or other techniques. Similarly, previously "pushed off" items that reappear due to space being made on the guide line may simply re-appear, or may be animated to fall from the top of the user interface back onto the guide line or to be spontaneously generated in a visually stimulating or humorous manner.

Where a guide line is discontinuous, items may be animated to move across the discontinuity. Items may be animated to move across the gap at a high velocity, or may be animated to be "pushed off" and "reappear" using any of the above visual effects. Likewise, items that are "pushed off" one end of a guide line to re-appear on the opposite end may be animated to move between the guide line end points at a high velocity, or may be animated to be "pushed off" and "reappear" using any of the above visual effects.

Figure 25:
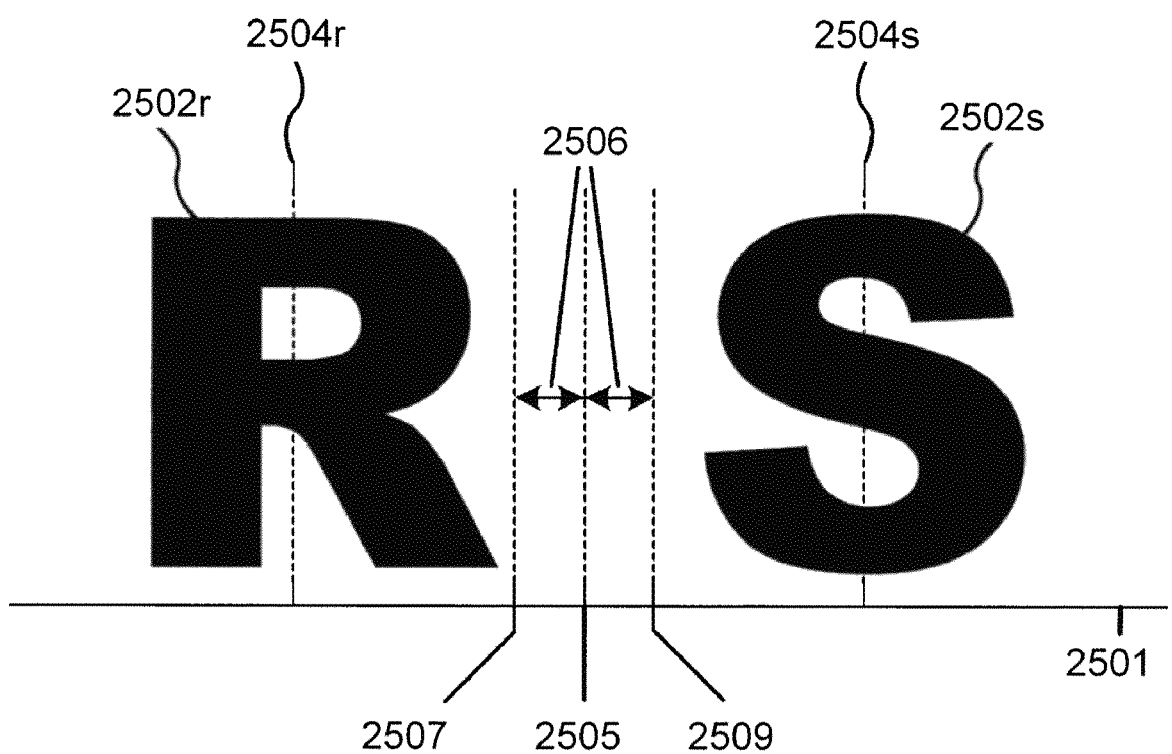

FIG. 25 depicts the activation of an item along a guide line, where "activation" or "highlighting" generally relate to the determination of an item to select. A system to determine an item to select may use hysteresis. Selection may include determining an initial selected item when a cursor initially crosses a guide line, where the initial selected item may be the item whose position is nearest in distance to the base position. Thereafter, in order to reduce inadvertent flicker between two adjacent items when a cursor is disposed in between items, selection may include determining a new selected item whenever the cursor moves a predefined distance beyond the midpoint between adjacent items.

For example, the position along a guide line 2501 of two items 2502r and 2502s are indicated by lines 2504r and 2504s, the position of the midpoint between the items 2502r and 2502s is indicated by line 2505, and a distance 2506 represents a predefined distance. If, for example, the item 2502s (i.e. the letter "S") is the initial selected item, the user would move a cursor left of line 2507, which is the predefined distance 2506 beyond the midpoint 2505 in the direction towards the item 2502r (i.e. the letter "R") to select the item 2502r. If the item 2502r is subsequently selected, to re-select the item 2502s, the user would move a cursor right of line 2509, which is the predefined distance 2506 beyond the midpoint 2505 in the direction towards the item 2502s.

The predefined distance may be defined based upon a desired maximum distance a cursor may be expected to waver or shake while the user attempts to remain still, accounting for the effects of user movements caused by involuntary body tremor or limitations of the input unit. An item may be deselected when the position of the cursor is below the guide line, or when a cursor is not found or is not within a particular user interface or region of the user interface occupied by the enhanced control. Selection of an item may further generate user feedback, including for example sounds, imagery, and/or a tactile output such as a vibration.

Displaying the items of the subset may include displaying items such that their appearance provides user feedback as to their state of selection. For example, a selected item may be displayed in a unique color, or be displayed with a visual effect such as the appearance of glowing. A currently selected item may be activated or highlighted when the item is in a selected state for longer than a first predefined duration threshold. In this regard, an item is activated when a cursor is held over an item for a period of time. Activation may be repeated or negated if a selected item remains selected for longer than a second predefined duration threshold.

Moreover, an item may be activated or highlight when a position of a cursor is stationary for a period of time. A cursor may be classified as stationary when the change in the component of position parallel to the guide line is less than a predefined distance threshold for more than a predefined time threshold. For example, an item closest to the position of the cursor is identified and activated. Activation may be repeated or negated if a cursor remains classified as stationary for longer than a second predefined duration threshold. Additionally, an item may be activated based on a distance between a cursor position and relative to a guide line. For instance, an item may be activated when such a distance exceeds a predefined distance threshold.

In other examples, activation of items may result from another type of user input after selection of the item. For instance, the user may provide another type of user input to activate a selected item. In these examples, to activate a selected item, the user may touch a user input button (e.g., on a controller), provide an audible input (e.g., saying "activate"), perform another type of gesture (e.g., move the hand used to select the item toward the display or move the user's other hand to another portion of the user interface to activate the selected item), or provide any other type of user input.

Figure 26:

FIGS. 26 to 29 illustrate exemplary item sets. In FIG. 26, items 2601, which include characters from the English alphabet, includes an item 2602 that, when activated or otherwise selected, opens a second set of items. When selected, the second set of items may appear along the guide line 2604 with the items 2601 or a portion of the items 2601, or the second set of items may replace the items 2601 on the guide line 2604. From the symbol used to represent the item 2602, the user may intuitively determine that the second set of items includes numbers.

Figure 27:
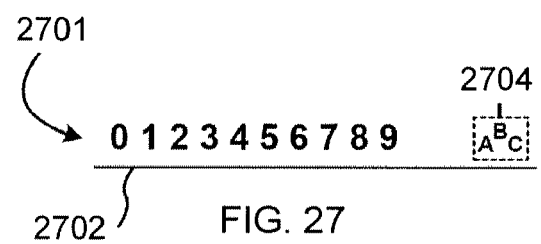

FIG. 27 illustrates items 2701 aligned with a guide line 2702. Items 2701 are displayed when the item 2602 in FIG. 26 is selected. Once the second set of items is selected, removal of the cursor below the guide line 2702 or removing the cursor from the user interface that displays the items 2701 may cause the items 2601 to be re-selected or re-activated. The items 2701 includes an item 2704 that, when activated, re-opens, re-activates or otherwise re-selects the items 2601. From the symbol used to represent the item 2704, the user may intuitively determine that the items 2601 include characters from the English alphabet.

Figure 28:
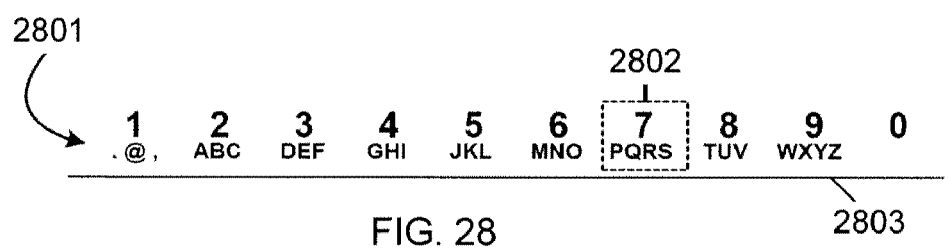
Figure 29:
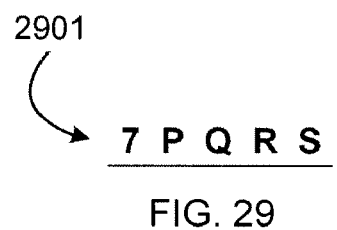

FIG. 28 illustrates items 2801 aligned with a guide line 2803, where the items each represent a combination of a number and letters that are known to be associated with keys on a standard telephone phone keypad. FIG. 29 illustrates items 2901, which are displayed when item 2802 of items 2801 is selected (see FIG. 28), and which include the combination of characters associated with the key number "7" on a standard telephone keypad.

Using the items illustrated in FIGS. 26 to 29, a camera-based text input mechanism may be provided, such as by sequentially filling in letters that form words into a text field. Upon activating a number, letter, text symbol, or predefined text, the number, letter, text symbol, or predefined text may be appended to a string of characters that has already been input. Alternatively, activation of an item (such as an item from items 2601 in FIG. 26) may display further items, and activation of an item of the further items may append the activated character onto a string of characters. One of the items may be a backspace item, to facilitate removal of the latest item from the string of items.

A camera-based text input mechanism may include combining characters to form compound characters. A text input mechanism for Japanese text input may include combining kana characters to form kanji characters (in a method familiar to users of Japanese personal computer keyboards). A first set of items may include items representing kana. When a kana item is activated, the corresponding kana character is appended to a string of characters. A set of items may include an item representing an operation, that when activated, activates a process that converts the latest kana characters of the string into kanji. The process of converting the latest kana characters of the string into kanji may include displaying a second set of candidate kanji items. Activating a kanji item activates a process where the latest kana characters of the string are replaced with the activated kanji. This camera-based text input method may be extended to other languages.

An alternative method for Japanese text input may include displaying a first set of items representing kana. When a kana item is activated, a second set of items is displayed. The second set of items may include the kanji for which the activated kana forms a part of. This set may be larger than the second set described above. This text input method may be extended to other languages.

A text input mechanism may include a confirmation item in a set of items. When activated, a confirmation item activates a process whereby a string of characters is provided to an application. Furthermore, the text input mechanism may include a predictive text completion process. A predictive text completion process may search a dictionary to find the most likely text that contains the characters of the string of characters. The most likely text may be displayed in an output field. A dictionary used in the predictive text completion process may be selected based on the context in which the text input mechanism is used. For example, a dictionary may include names when the text input mechanism is used to enter a name.

An application process may determine items for the user interface, depending on the state of the application. Activating an item may provide a message to an application process. The application process may be controlled based on the message.

Figure 30:
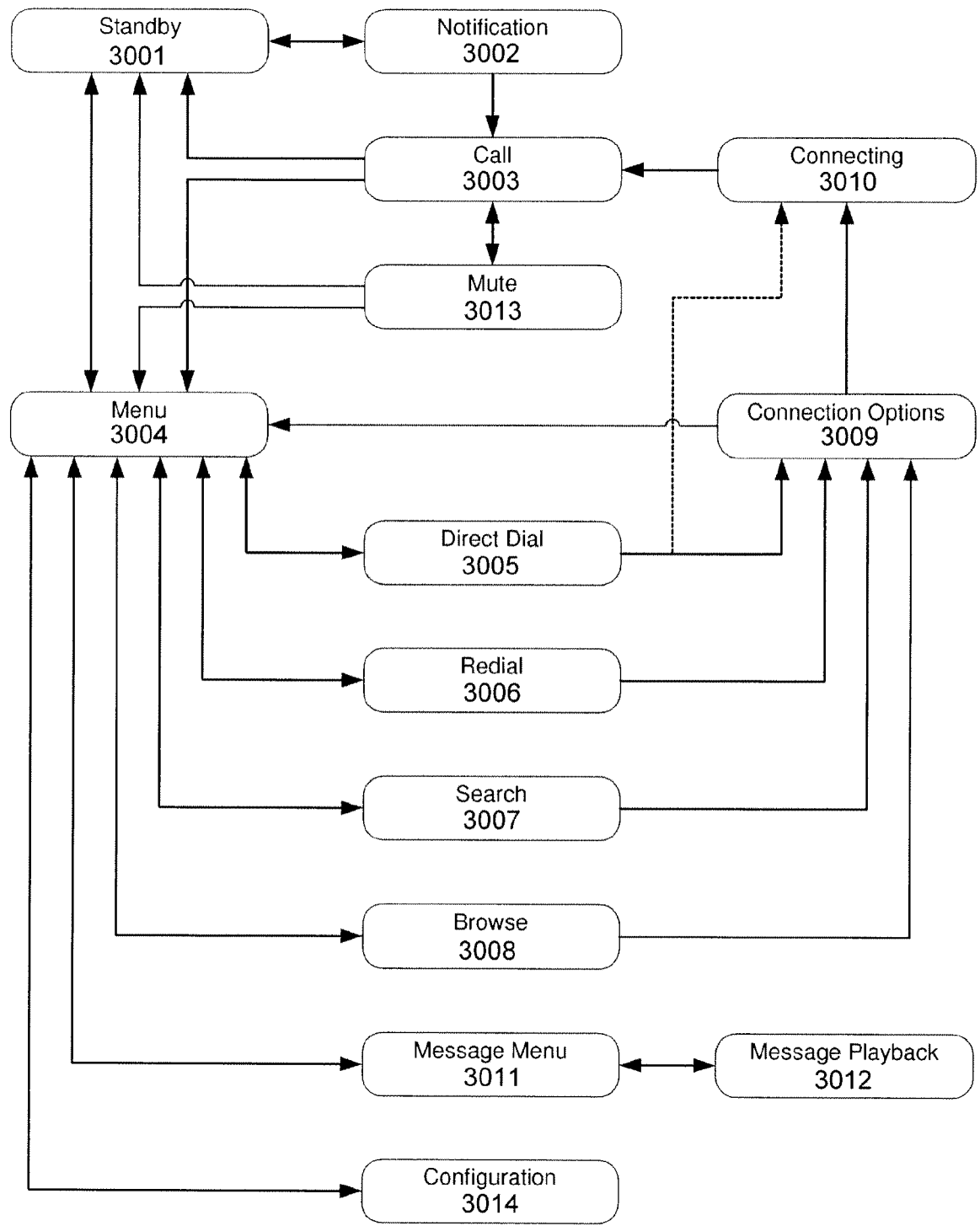
FIG. 30 is a flow diagram illustrating states of the system.

FIG. 30 illustrates an example of states of the system. The system may include various states shown in FIG. 30. The system may include the following states: a standby state 3001, where the system waits for either an incoming call or the user to activate the system; a notification state 3002, where the system notifies a user of an incoming call and waits for the user to activate the system; a call state 3003, where the system facilitates audio or video communications with another system; a menu state 3004, where the system displays options and functions for a user to select; a direct dial state 3005, where the system permits a user to enter a phone number or address; a redial state 3006, where the system permits a user to select a contact associated with a recent call; a search state 3007, where the system permits a user to enter a name, and matching contacts are found in a database; a browse state 3008, where the system permits a user to browse contacts in a database; a connection options and confirmation state 3009, where the system displays information about a contact and confirms the users intention to call the contact; a connecting state 3010, where a system establishes a connection with a remote system; a message menu state 3011, where the system permits a user to select messages to review; a message playback state 3012, where the system plays messages; a message mute state 3013, where calls are muted; and a configuration state 3014, where a user may configure the system, such as registering his face. The system may include fewer states, or additional states not listed. The system may enter the various states in a different manner or order than shown in FIG. 30.

The system includes a standby state 3001. The system may be inconspicuous while in the standby state 3001, such that the system does not respond to incidental user movements or display anything unnecessary on the display device 104. This may permit the display to be used by other applications or for other purposes while the system is in standby (e.g., watching television or playing video games).

While in the standby state 3001, the system may monitor a network for incoming calls. The system may enter a notification state 3002 when an incoming call or other message is received.

The system may be configured to send a control signal to a display device when an incoming call is received. The control signal may turn the display device on and select an input setting so that the display device displays the image generated by the system. The system may be configured to send a control signal to other applications or devices when an incoming call is received. For example, the control signal may pause an application or program executing when the call is received (e.g., pause a video game being played or a television program being watched when a call is received). A control signal may be an infrared signal, an electronic signal over a direct wired connection, or a network message, to name a few examples.

The system may be configured to enter a notification state 3002 if a face detection process detects a face. This may allow the system to avoid turning on a display device when no user is present.

The system may be configured to accept calls intended for multiple users. The system may enter a notification state 3002 conditioned on a face recognition process identifying a face of a user corresponding to the user for which the call is intended. This may allow the system to avoid disrupting the activities of other users, when the intended recipient is not present. This also may help to ensure the intended recipient's privacy is protected.

When an incoming communication is detected, the system may enter a notification state 3002. While in the notification state 3002, the system may produce a visual cue displayed on a display device.

Figure 31:
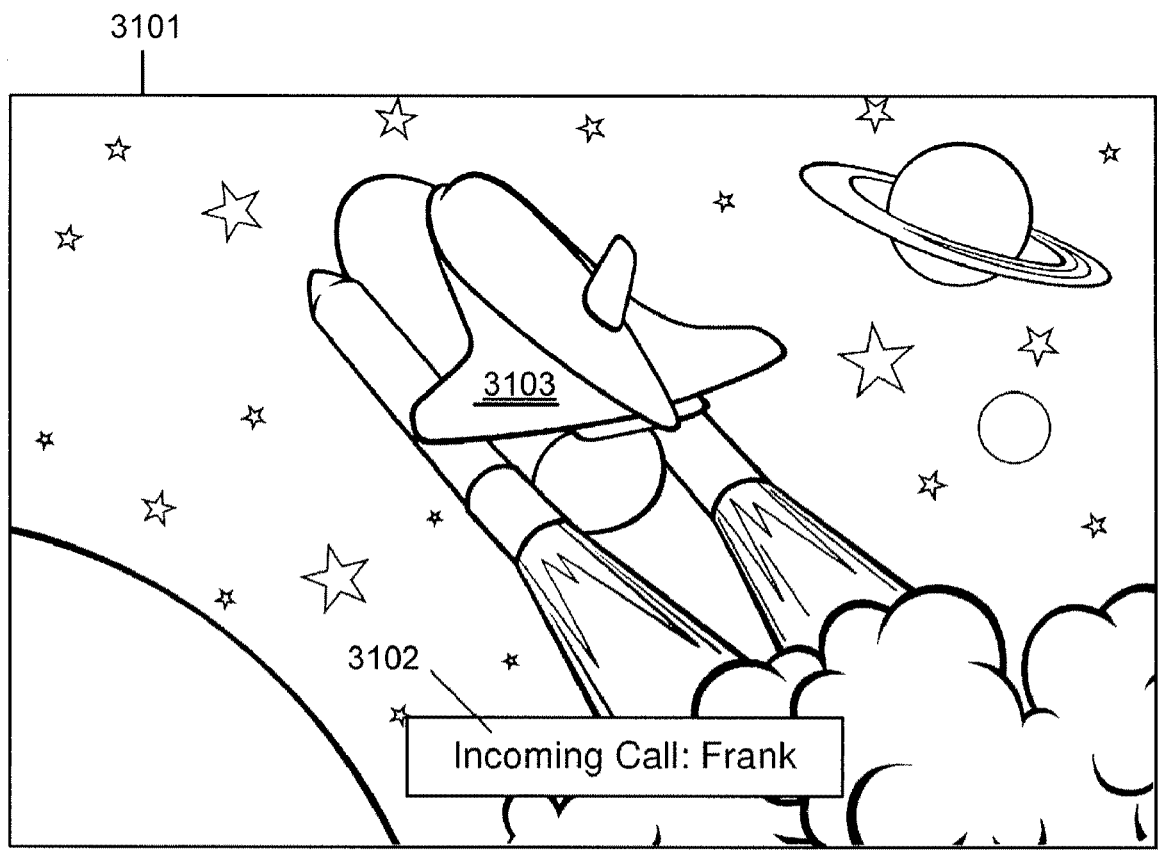
FIG. 31 depicts an example of a notification user interface.

FIG. 31 depicts an example of a notification user interface 3101. A visual cue 3102 may be superimposed over other video content 3103 produced by other applications or other devices (e.g., a television program or video game, as illustrated in FIG. 31). While in the notification state 3002, the system also may produce an audible cue produced on audio speakers. The audible cue may be mixed with other audio content produced by other applications or other devices, for example a television program or video game soundtrack.

While in the standby state 3001 and notification state 3002, the system may monitor images captured by a camera for an engagement hand gesture. A processor may detect an engagement hand gesture such that the user may engage the system by performing an engagement hand gesture. The engagement hand gesture may be a gesture that is unlikely to be performed accidentally by a user, and simple enough that it may be performed without the need for a representation of a user to be displayed on the display device.

Figure 32:
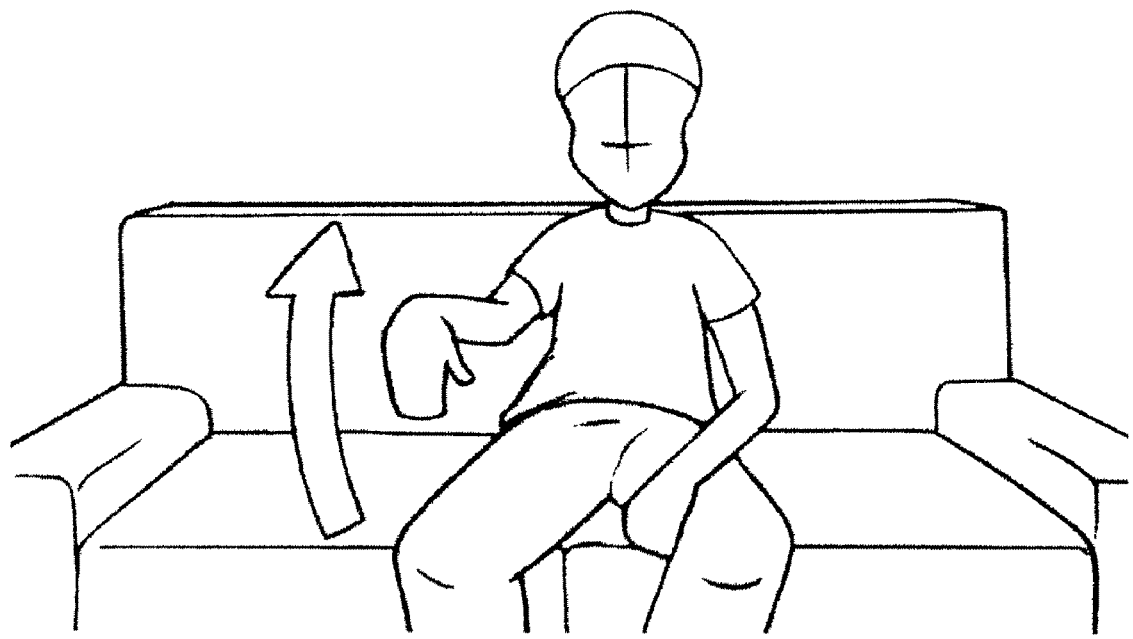
FIG. 32 illustrates an example of a camera image including a user performing an engagement hand gesture.

FIG. 32 illustrates an example of a camera image including a user performing an engagement hand gesture. As shown in FIG. 32, an example engagement hand gesture includes raising a hand upwards in a vertical motion until it is over the user's head. This gesture is sufficiently uncommon that it is unlikely to be performed accidentally or unconsciously by a user. A user may consider this gesture to be intuitive and easily remembered because it may be reminiscent of a student raising his hand to "engage" a teacher in school.

An engagement gesture may be a specific hand pose or hand motion sequence gesticulated in a tracking region of a camera in front of a display that is held for a predetermined amount of time. One example gesture is a hand pose held in an upright position with all fingers and thumb spread apart widely. Another example is a waving hand motion, or a circular hand motion made by extending the user's arm in front of their face, and moving their arm in a circle in front of their head. In essence, an engagement gesture specifies to the device that generates the user interface that the user is ready for further camera-based input to occur. To reduce errors, an engagement gesture may be an atypical gesture, such as a gesture that would not subconsciously be made with body language during an a normal conversation, or a gesture that would not be made in the ordinary performance of normal human activity.

A hand gesture identification process may identify an engagement hand gesture while the system is in the standby state 3001 and/or the notification state 3002. Referring to FIG. 30, the system may enter the menu state 3004 when an engagement hand gesture is detected while in a standby state 3001. The system may enter the call state 3003 when an engagement hand gesture is detected while in a notification state 3002.

The system may be configured so that only the intended recipient of the call, or an authorized user of the system, may answer the call. A hand gesture identification process may detect an engagement hand gesture, and a face recognition process may identify the user who performs the engagement hand gesture. In this example, the system may enter the call state 3003 if, or only if, the user who performs the engagement hand gesture is identified, by the face recognition process, as the intended recipient of the call, or an authorized user of the system.

Figure 33:
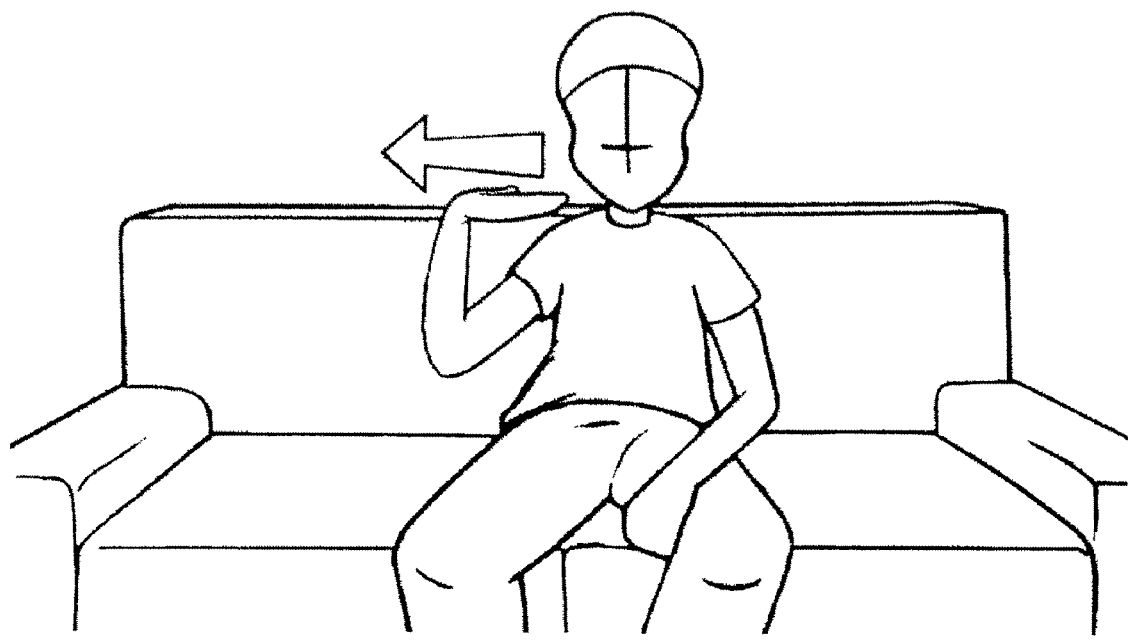
FIG. 33 illustrates an example of a camera image including a user performing a disengagement hand gesture.

A disengagement hand gesture may be defined. The disengagement hand gesture may be a gesture that is unlikely to be performed accidentally by a user. FIG. 33 illustrates an example of a camera image including a user performing a disengagement hand gesture. As shown in FIG. 33, the disengagement hand gesture may include moving the hand horizontally.

The system may be configured to mute notification messages when a disengagement hand gesture is detected. While in the notification state 3002, a hand gesture identification process performed by a processor may monitor images captured by a camera for a disengagement hand gesture. If the processor detects a disengagement hand gesture, the processor may direct the system to return to the standby state 3001.

In some implementations, the system may be configured to disconnect a call when a disengagement hand gesture is detected. When in the call state 3003, a hand gesture identification process performed by a processor may monitor images captured by a camera for a disengagement hand gesture. If the processor detects a disengagement hand gesture, the processor may direct the system to return to the standby state 3001.

A mute hand gesture also may be defined. A hand gesture identification process may monitor images captured by a camera for a mute hand gesture, and enter a mute state 3013 if a mute hand gesture is detected.

The system may be configured to focus on a user. Focusing on a user may include panning and zooming a camera, so that the user's face appears centered, and at a specified size, in the camera image. Focusing on a user may include cropping and scaling a camera image, so that the user's face appears centered, and at a specified size, in the camera image. A specified size may be defined such that the camera image includes the user's arms throughout a range of motion. A specified size also may be defined such that a user can reach within a predefined distance of the camera image edges, thereby assuring that interactive items and buttons (e.g., items 502, 504, 505, 506, and 507 of FIG. 5) are within the user's reach.

The system may be configured to focus on a user based on a user reference position. A user reference position may be determined by a face detection process. For instance, a user reference position may be determined as the nearest face position to the position at which the engagement hand gesture was detected.

Figure 34:
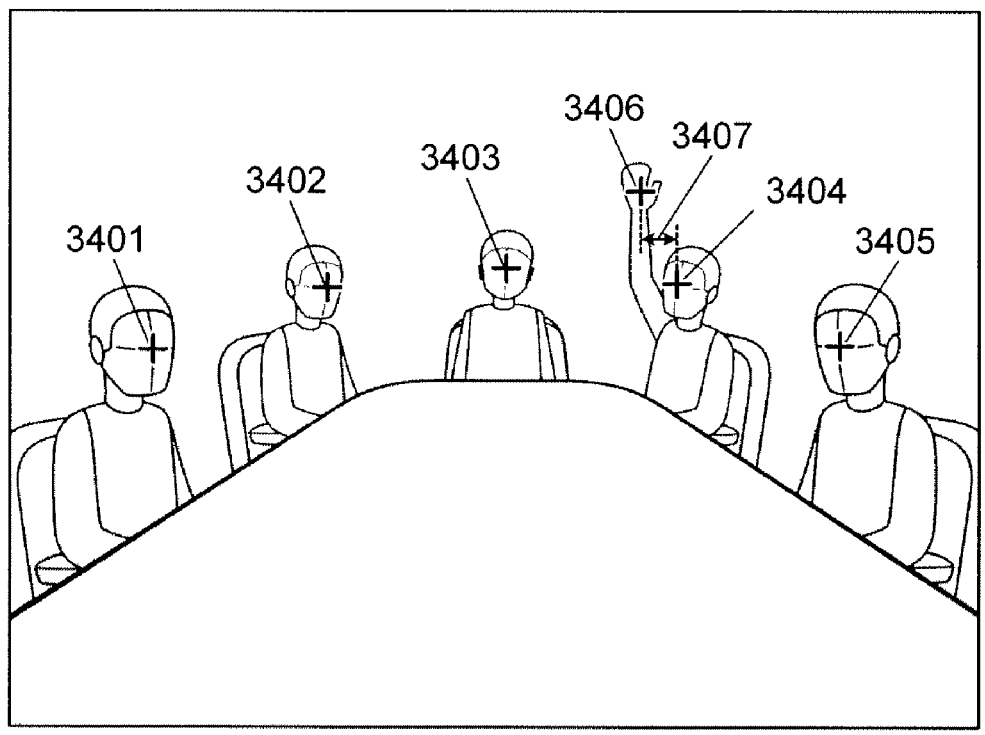
FIG. 34 illustrates an example of a camera image including multiple people seated at a conference table.

FIG. 34 illustrates an example of a camera image including multiple people seated at a conference table. The people seated at the conference table may be engaged in a video conferencing session. Referring to FIG. 34, numerals 3401, 3402, 3403, 3404, and 3405 indicate face positions determined by a face detection process. The position of the engagement hand gesture is indicated by numeral 3406. A close face position (3404) is selected as a user reference position. The close face position may be calculated as the face position and gesture position pair having the minimum absolute value of the horizontal component (3407) of the distance between the face position and gesture position. Isolating the horizontal component of the distance may be advantageous because the hand position may be expected to be above the head during the engagement hand gesture. A user reference position also may be determined by a user position process in which a centroid of a foreground part of a segmented image is determined to be a user position.

The system may track a user reference position so that the camera maintains focus on a user while a user moves (e.g., the camera image follows the user). Camera panning and zooming may help assure that the user remains within the transmitted image (e.g., during videoconferencing). Camera panning and zooming also may help assure that buttons that may be displayed on the display device remain within easy reach of the user.

Panning and zooming a camera may include transmitting control information to motorized actuators. Motorized actuators may pan a camera's viewpoint, and manipulate camera optics to zoom a camera image. Focusing on a user may include simulating a pan and zoom function using image processing or other computational techniques. For example, focusing on a user may include simulating a pan and zoom function by cropping and scaling a camera image.

Figure 35:
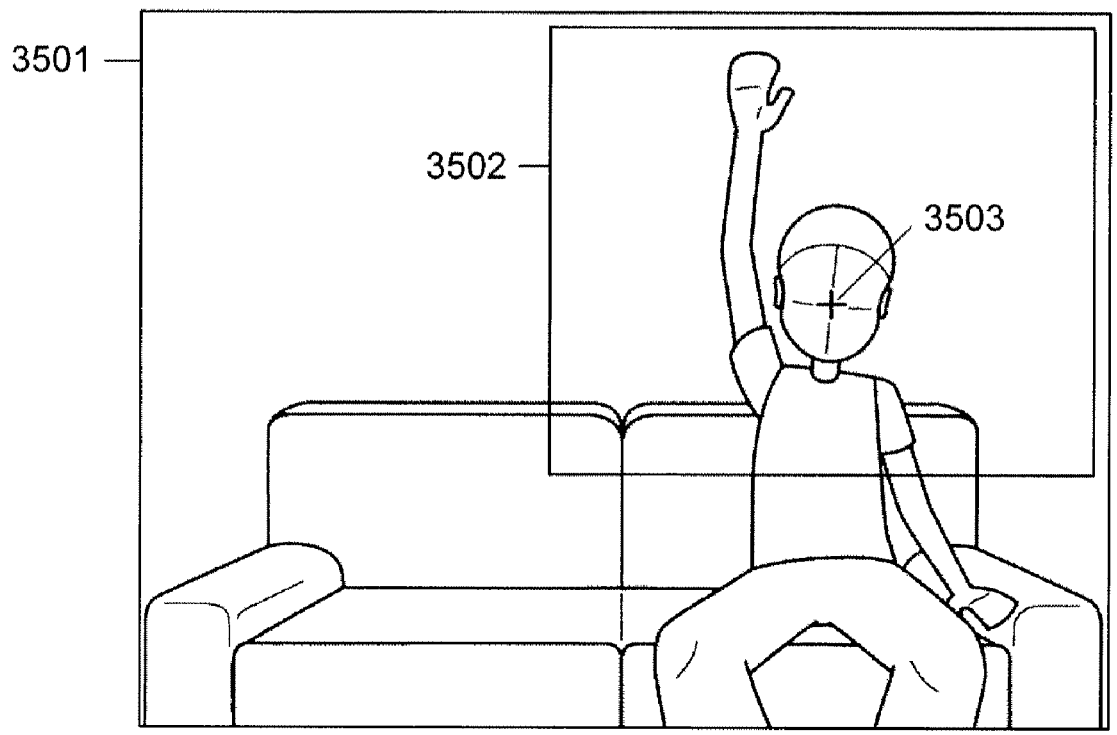
FIGS. 35 and 36 illustrate examples of focusing on a user by cropping and scaling a camera image.
Figure 36:
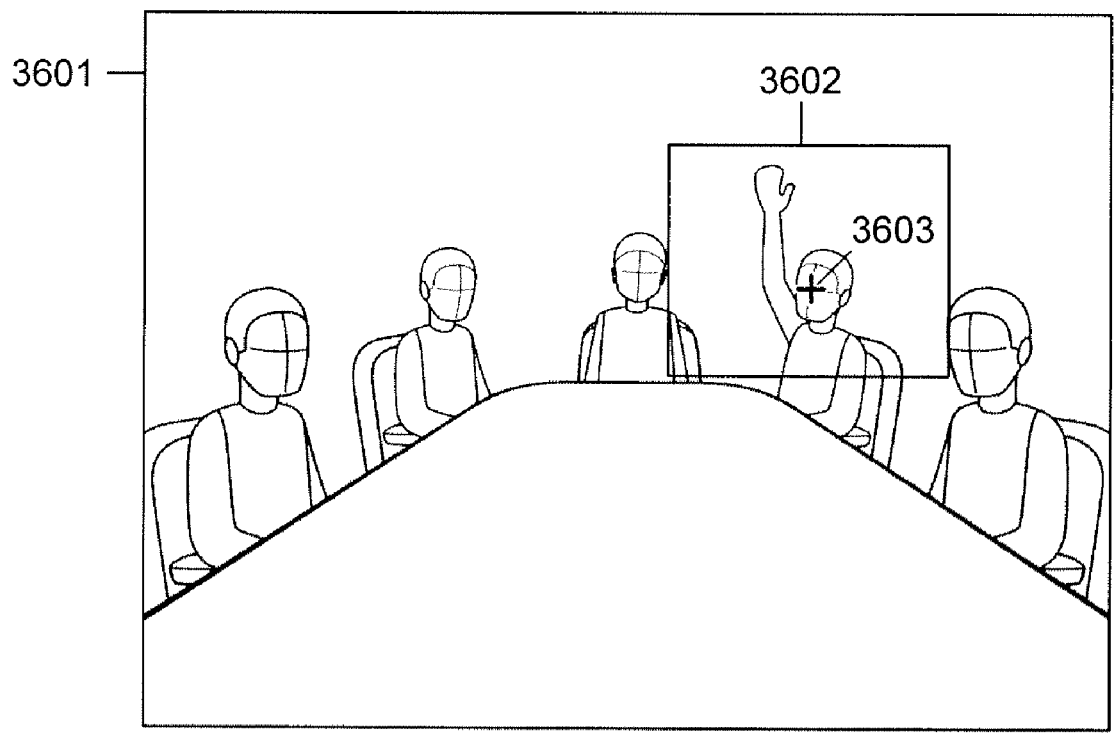

FIGS. 35 and 36 illustrate examples of focusing on a user by cropping and scaling a camera image. Referring to FIG. 35, cropping a camera image 3501 may include selecting a part 3502 of a camera image including a user reference position 3503. Similarly, as shown in FIG. 36, cropping a camera image 3601 may include selecting a part 3602 of a camera image including a user reference position 3603. Scaling a camera image may include generating an image through magnification or decimation, where the size of the generated image may be different than the size of the part.

The system further may include localizing audio to focus on a user based on a user reference position. A microphone may include multiple sensors (e.g., multiple microphones). A sound localization process may increase the sensitivity of sound originating in the direction corresponding to the user reference position, and decrease the sensitivity of sound originating from other directions. For instance, a processor performing the sound localization process may turn off microphones or sensors located far from the user reference position (e.g., the processor may leave the nearest microphone or sensor on). A sound localization process may utilize a beamforming process, whereby the phase and amplitude of the signal received by each sensor of the microphone array is compared.

The system may be configured to change the focus from a first user to a second user, in a multi-user environment (e.g., a boardroom). A first user may perform a hand gesture (e.g., the engagement hand gesture) to acquire focus, as described above. Later (but during the same call), a second user may perform a hand gesture (e.g., the engagement hand gesture, or a transfer of focus gesture) to acquire focus from the first user. For example, in response to detecting the engagement hand gesture performed by the second user, the camera image may pan from the first user to the second user and a microphone may localize the voice of the second user.

Figure 37:
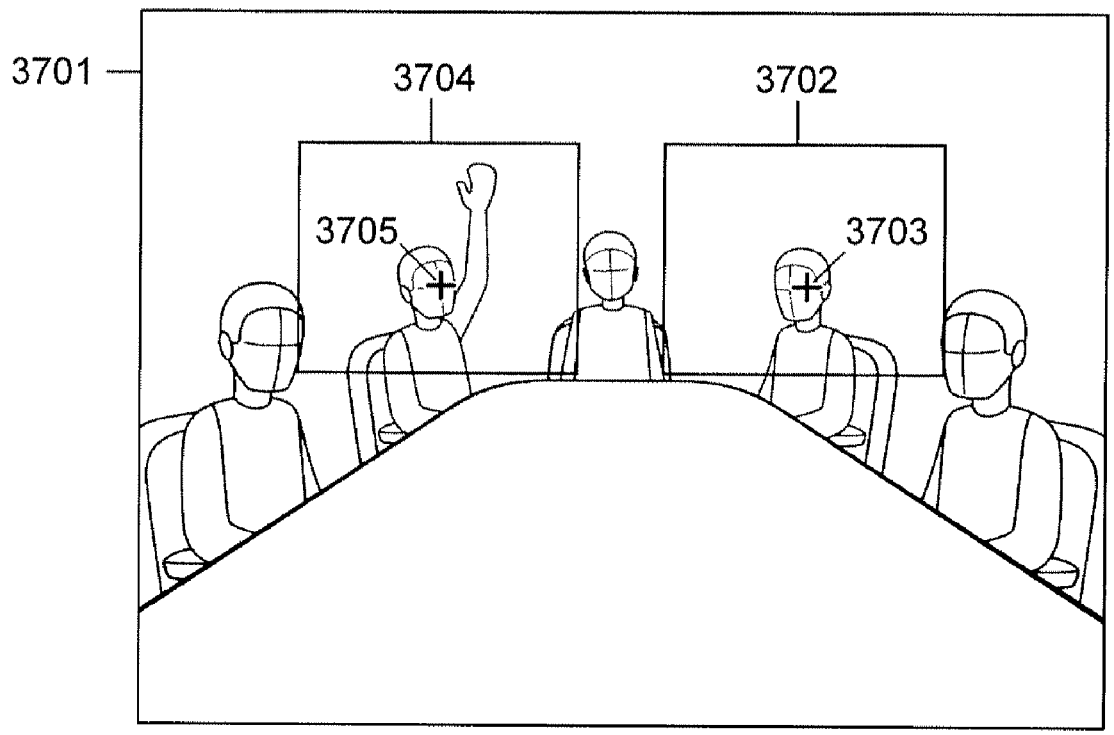
FIG. 37 illustrates an example of a camera image changing focus from a first user to a second user.

FIG. 37 illustrates an example of a camera image changing focus from a first user to a second user. Referring to the example of FIG. 37 (which depicts an image similar to the example of FIG. 36), a first part 3702 of a camera image 3701 is selected based upon a first user reference position 3703. The system may include a hand gesture identification process that operates while in the call state 3003. In implementations in which panning and zooming a camera includes cropping and scaling a camera image, the hand gesture identification process may analyze the complete camera image 3701 (e.g., not just the part 3702) to identify a second user. Upon detection of an engagement hand gesture by a second user, a second part 3704 of the camera image 3701 is selected based upon a second user reference position 3705. A part (3702 or 3704) of a camera image may be compressed by a video compression process, and transmitted over a network. This example permits users in a multi-user environment to select themselves as the active speaker by performing a hand gesture.

The system further may include an arbitration process, to enforce restrictions on when a user may obtain focus. For example, an arbitration process may prevent a second user from disrupting a first user by analyzing the localized sound from the direction of a first user, classifying the sound as voice or not voice, and permitting a second user to obtain focus only when the first user's voice is not detected. An arbitration process may queue user requests to obtain focus, and focus on the next queued user when the first user's voice is no longer detected. Alternatively, an arbitration process may queue user requests to obtain focus, and focus on the next queued user when a gesture identification process detects a hand gesture performed by a first user, thereby allowing a first user to indicate when he or she is finished and would like to relinquish focus.

While in the call state 3003, the system may display a preview image of the focused user. A preview image may include a panned and zoomed camera image, or a cropped and scaled part of a camera image. A preview image may occupy a part of a user interface. One or more video images of remote users may occupy other parts of a user interface.

Some operations, such as engaging the system and answering an incoming call, may be performed using hand gestures without direct user feedback. However, the number and complexity of hand gestures that a user may perform without direct user feedback may be limited by user training. Some operations in some system states may require complex user interactions, such as selecting contacts or dialing numbers. While in these states, the system may display a representation of a user. Displaying a representation of a user may assist the user in touching onscreen items, thereby reducing the user training requirements and producing an intuitive interface. A process to generate a representation of a user, a process to compare a user position with application generated items, and an enhanced user interface process facilitating entering text and numbers are described above.

Figure 38:
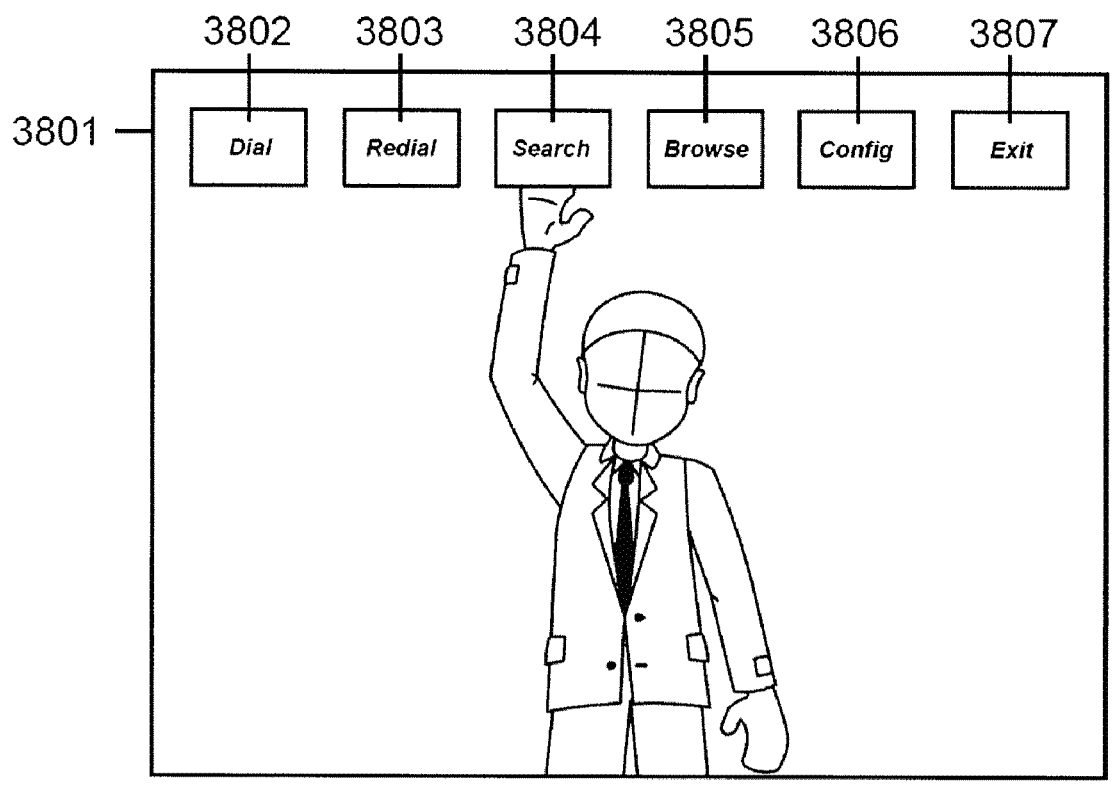
FIG. 38 illustrates an example of a menu state user interface.

The system may include a menu state 3004. The menu state 3004 may enable a user to select to enter a different state or may enable a user to change system options or settings. FIG. 38 illustrates an example of a menu state user interface 3801. The menu state user interface 3801 includes a set of buttons (3802 through 3807) that, when selected, cause the system to enter another state. The buttons may represent each state by an icon image or text on each button.

The menu state 3004 may include a face recognition process that determines the identity of the user. States may be disabled if the user is not recognized, or not authorized access to certain functions. For example, a child may not be permitted to enter a direct dial state 3005 because the direct dial state allows an arbitrary contact to be dialed. A status (e.g., a number of unviewed messages) may be displayed in a menu state.

The system may include a direct dial state 3005. In a direct dial state 3005, a user may enter a contact number or address (e.g., a phone number, email address, Skype user handle, Xbox Live gamer tag, etc.). A direct dial state 3005 may use an enhanced user interface facilitating user selection of items. The enhanced user interface process facilitating user selection of items may include a set of items representing numbers, letters, common phrases (e.g., ".com", or the local telephone area codes), and functions (e.g., backspace). The set of items may be determined based on the communications network (e.g., a set of items may include numbers if connectivity to a telephone network is available). The letters or numbers entered may be displayed as text.

Figure 39:
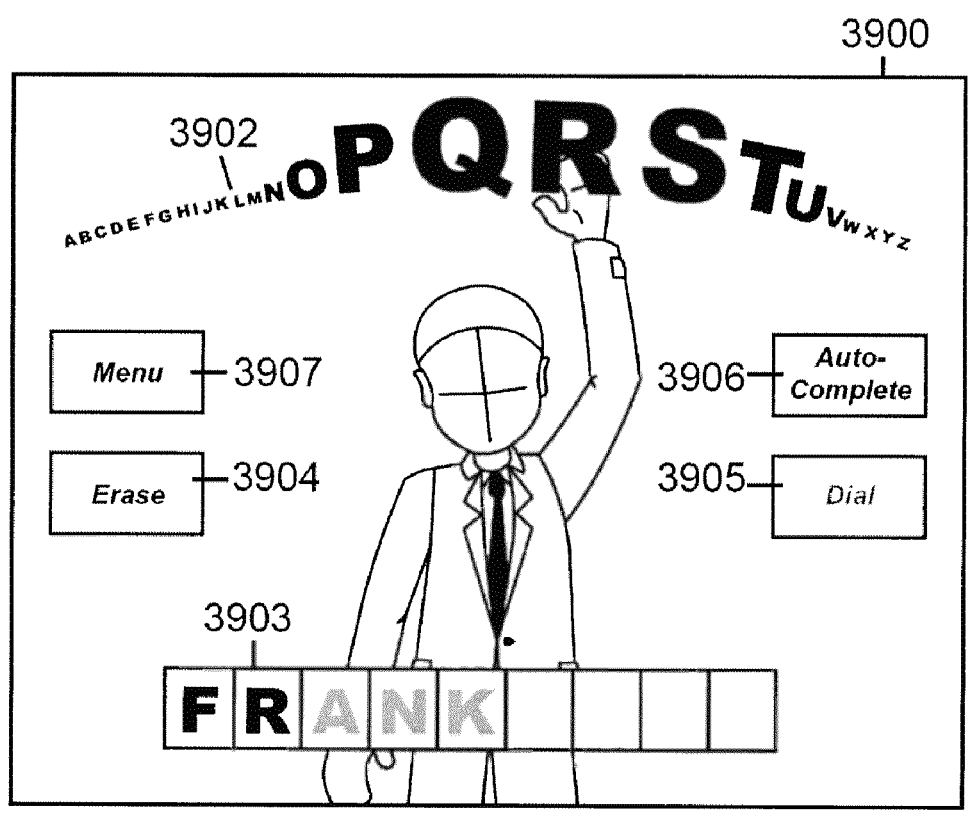
FIG. 39 illustrates an example of a direct dial state user interface.

FIG. 39 illustrates an example of a direct dial state user interface 3900. A set of items, representing letters, is displayed as representations of items 3902. Text entered by the enhanced user interface process is illustrated as text 3903. In a direct dial state 3005, a button (e.g., button 3904) may be displayed or a hand gesture may be recognized for a backspace function, to remove a recent number or letter.

In a direct dial state 3005, a button (e.g., button 3905) may be displayed or a hand gesture may be recognized for a dial function, which starts a process to initialize communications with the currently entered contact or telephone number. A button or hand gesture for a dial function may be disabled by default, and enabled when the contact information is determined to be complete (e.g., the correct number of digits of a phone number). Multiple dial functions may be available, representing different connection options (e.g., voice only, or voice and video) in the direct dial state 3005, or in a connection options state 3009. Upon selection of a dial function, the system may enter a connection options state 3009. Alternatively, a system may bypass a connection options state and go directly to a connecting state 3010.

A direct dial state 3005 may include an auto-complete process. An auto-complete process searches a set of contacts for a potential match based on a partially entered contact number or address. A set of contacts may include a set of recently dialed contacts, a set of missed calls, and a set of contacts in an address book. An auto-completion process may include filtering the set of contacts based on the identity of a user, as determined by a face recognition process. For example, only contacts dialed by the identified user, or in the identified users personal address book, may be included for consideration as a potential match. This may enhance a user's privacy. In a direct dial state 3005, an auto-complete process potential match may be displayed in a visual style (e.g., a color) that distinguishes it from the text entered by a user (e.g., gray letters of text 3903 illustrated in FIG. 39). A button (e.g., button 3906) may be displayed or a hand gesture recognized for an accept function, which accepts the contact indicated by the auto-complete process and starts a process to initialize communications with that contact.

A direct dial state 3005 may include a face recognition process to determine the identity of the user. The contacts that a user may enter and dial may be limited based on the user's identity. For example, an unrecognized user may be prevented from dialing long-distance telephone numbers.

A direct dial state 3005 may display a button (e.g., button 3907) or recognize a hand gesture for an exit function, which causes the system to return to the menu state 3004. Alternatively, an exit function may return to a standby state 3001.

The system may include a search state 3007. In a search state, a user may enter a name. The system may search a set of contacts for a potential match for the entered name. A search state may use an enhanced user interface facilitating user selection of items. The enhanced user interface may include a set of items representing letters, numbers, and functions (e.g., backspace). The letters or numbers entered may be displayed as text.

For example, the user interface 3900 in FIG. 39 illustrates an example of a search state user interface, where the user selects letters from the items 3902 and the entered letters are displayed as text 3903. Similar to the direct dial state 3005, a search state 3007 may include an auto-complete process. Based on a partially entered contact name, or a completed contact name, a search process searches a set of contacts for a potential match. A set of contacts may include a set of recently dialed contacts, a set of missed calls, and a set of contacts in an address book. An auto-completion process may include filtering the set of contacts based on the identity of a user, as determined by a face recognition process. For example, only contacts dialed by that user, or in that user's personal address book, may be included for consideration as a potential match This may enhance a user's privacy. A search state 3007 may display an auto-complete process potential match in a visual style (e.g., a color) that distinguishes it from the text entered by a user (e.g., gray letters of text 3903 illustrated in FIG. 39). A search state 3007 may display a button (e.g., button 3906) or recognize a hand gesture for an accept function, which accepts the contact indicated by the auto-complete process and starts a process to initialize communications with that contact.

A search state 3007 may display a button (e.g., button 3907) or recognize a hand gesture for an exit function, which causes the system to return to the menu state 3004. Alternatively, an exit function may return to a standby state 3001. The system may include a redial state 3006. In a redial state 3006, a user may select a previously dialed contact. A redial state 3006 may list a set of contacts. A set of contacts may include recently dialed contacts, outgoing calls, incoming calls, and missed calls.

A redial state 3006 may include a face recognition process to determine the identity of the user. The set of contacts may be filtered based on the user's identity. For example, the set of contacts may include only contacts previously dialed by the identified user.

Figure 40:
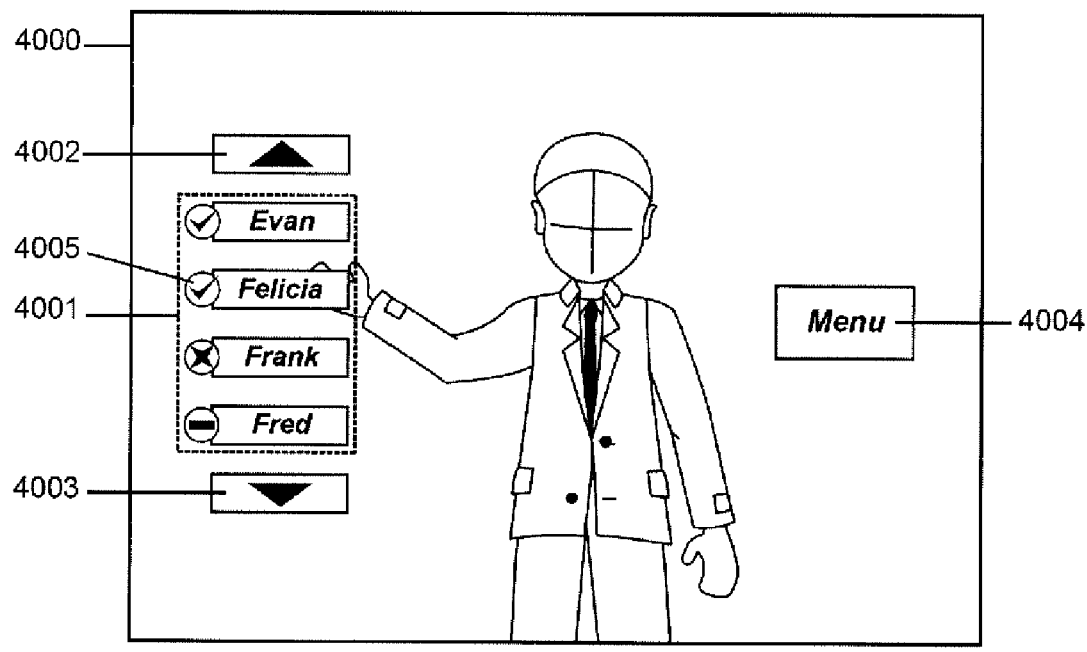
FIGS. 40 and 41 illustrate examples of a redial state user interface.

FIG. 40 illustrates an example of a redial state user interface 4000. A redial state may display a set of buttons (e.g., buttons 4001) or recognize a set of hand gestures corresponding to a subset of the set of contacts. When a contact is selected, the system may start a process to initialize communications with the selected contact. Alternatively, the system may display additional buttons or recognize additional hand gestures representing functions associated with the contact. Functions associated with a contact may include displaying information about a contact, selecting a method of communicating with a contact (e.g., dial the contact's mobile, office, or home phone number), sending the contact a message, or erasing the contact from the set. These options may be presented in the redial state 3006, or in a connection options state 3009. Upon selection of a dial function, the system may enter a connection options state 3009. Alternatively, a system may bypass a connection options state 3009 and go directly to a connecting state 3010.

A redial state further may display buttons (e.g., buttons 4002 and 4003) or recognize a hand gesture to scroll the subset of contacts. When one of the buttons 4002 and 4003 is selected, a new subset of contacts may be selected. Scrolling allows a user to select from among a large number of contacts.

Figure 41:
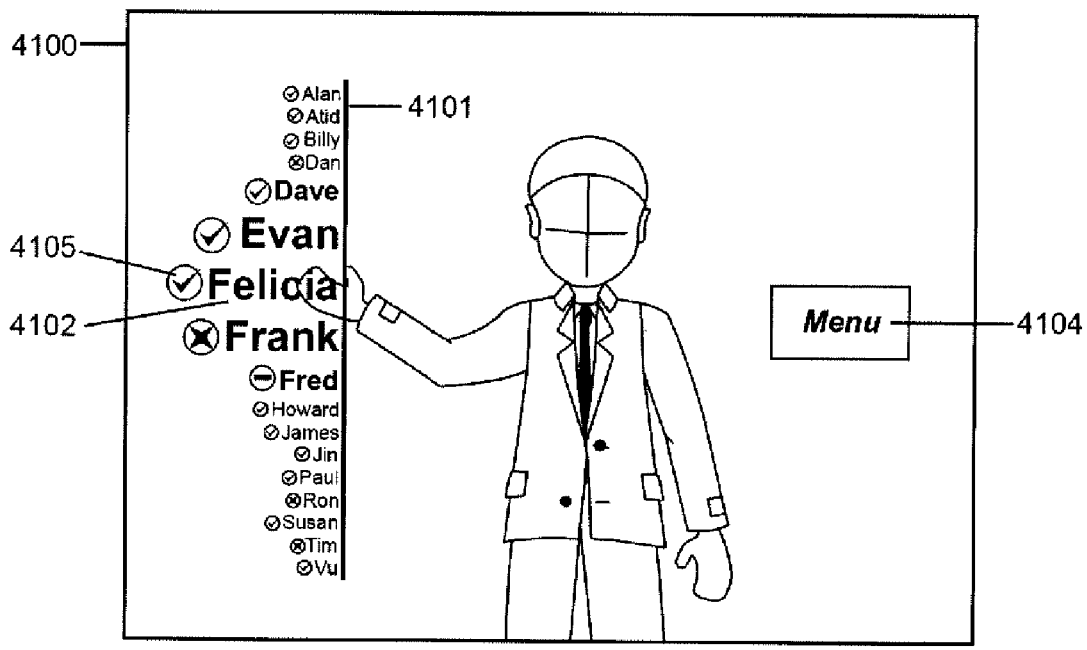

A redial state 3006 may use an enhanced user interface facilitating the user selection of items. The enhanced user interface may include a set representing contacts. FIG. 41 illustrates an example of a redial state user interface 4100. A set of items 4102 are displayed at a small size, so that a large list may be displayed. The size and position of contacts is dynamically adjusted to facilitate selecting a contact. The set of items 4102 may be arranged relative to a guide line 4101, where the guide line 4101 is vertically oriented as illustrated in FIG. 41. An enhanced user interface may include a first set representing categories. Selecting an item of a first set may display a second set of items, the second set including contacts filed under the first selected category. Categories may include the letters of the alphabet, and items in a category may include contact names starting with that letter.

Displaying a contact may include displaying a state of the contact. A state may represent the availability of the contact (e.g., if the contact is currently online). A redial state 3006 may display a button (e.g., button 4104) or recognize a hand gesture for an exit function, which causes the system to return to the menu state 3004. Alternatively, an exit function may return to a standby state 3001.

The system may include a browse state 3008. In a browse state 3008, a user may select a previously known contact. A browse state 3008 may list a set of contacts. A set of contacts may include contacts in a personal contact list, or contacts in a remote database (e.g., an online phonebook or a company directory), and also may include names of people, names of businesses, names of departments, etc.

A browse state 3008 may include a face recognition process to determine the identity of the user. The set of contacts may be filtered based on the user's identity. For example, the set of contacts may include contacts in the identified user's personal address book. In another example, the set of contacts may exclude contacts in a database if an authorized user is not identified (e.g., an underage user may be preventing from contacting an adult-oriented business).

A browse state 3008 user interface may appear similar to the user interface 4000 illustrated in FIG. 40. A browse state 3008 may display a button or recognize a hand gesture for each contact of a subset of the set of contacts. When a contact is selected, the system may start a process to initialize communications with the selected contact. Alternatively, the system may display additional buttons or recognize additional hand gestures representing functions associated with the contact. Functions associated with a contact may include displaying information about a contact, selecting a method of communicating with a contact (e.g., dial the contact's mobile, office, or home phone number), sending the contact a message, or displaying information about the contact (e.g., an address or advertisement). These options may be presented in the redial state 3006, or in a connection options state 3009. Upon selection of a dial function, the system may enter a connection options state 3009. Alternatively, a system may bypass a connection options state 3009 and go directly to a connecting state 3010.

A browse state 3008 may further display one or more buttons or recognize a hand gesture to scroll the subset of contacts. When a scroll button is selected or a scroll hand gesture is performed, a new subset of contacts may be selected. Scrolling allows a user to select from among a large number of contacts.

A browse state 3008 may use an enhanced user interface facilitating user selection of items. Contacts may be displayed at a small size. The size and position of contacts may be dynamically adjusted to facilitate selecting a contact. An enhanced user interface may include a first set representing categories. Selecting an item of a first set may display a second set of items, the second set including contacts filed under the first selected category. Categories may include the letters of the alphabet and items in a category may include contact names starting with that letter. Categories may include keywords representing relationships to a user (e.g., friends, family, business associates, etc.). Categories may include keywords representing services (e.g., sales, support, shipping, etc.).

Displaying a contact may include displaying a state of the contact. A state may represent the availability of the contact (e.g., if the contact is currently online, offline, away, or requested to not be disturbed). A state may be represented by an icon (e.g., icon 4005). A connection options and information state 3009 may present multiple connection options (e.g., voice only, voice and video, and dialing the contact's mobile, office, or home phone number). A connection options and information state 3009 also may provide options for sending the contact a message, or adding and erasing the contact from a set of contacts. A connection options and information state 3009 further may display information about a contact.

Figure 42:
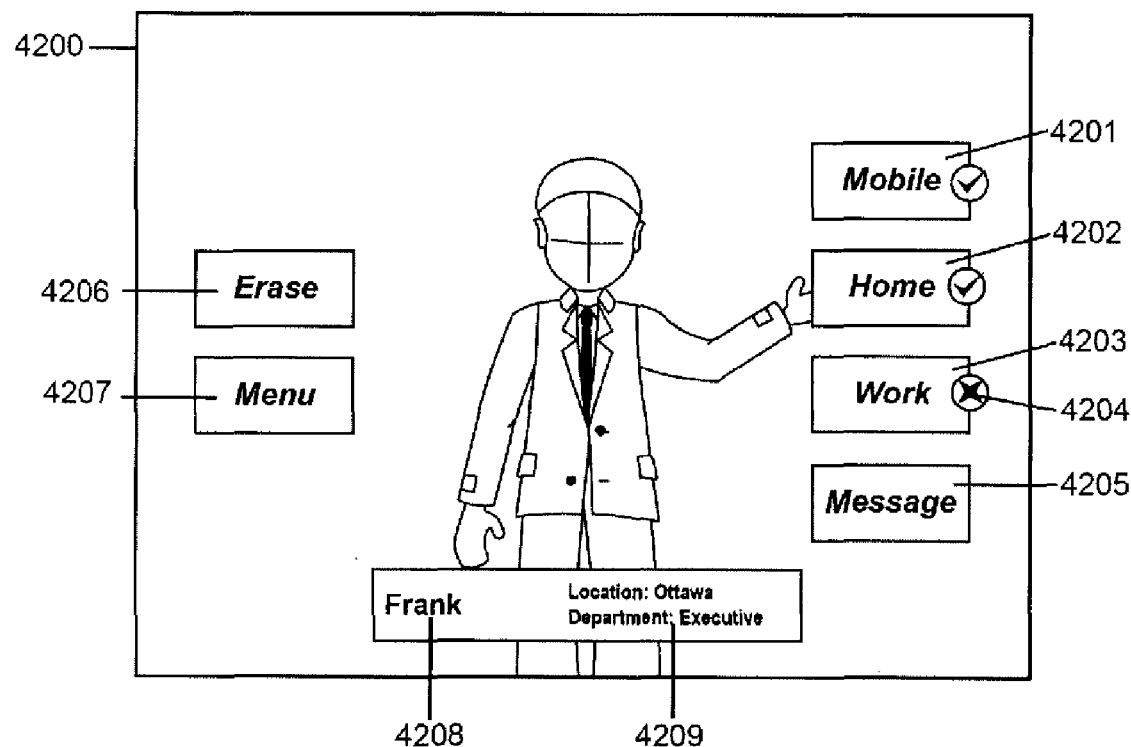
FIG. 42 illustrates an example of a connection options and information state user interface.

FIG. 42 illustrates an example of a connection options and information state user interface 4200. The state 3009 may include a button or recognize a hand gesture for each connection method (e.g., buttons 4201, 4202, and 4203). Selecting a connection method may cause the process to proceed to a connecting state 3010. Displaying a connection method may include displaying a state of the connection method. A state may represent the availability of the connecting to the contact by that method (e.g., if the contact is currently online, offline, away, or requested to not be disturbed). A state may be represented as an icon (e.g., icon 4204).

The connection options state 3009 may include a button (e.g., button 4205) or recognize a hand gesture for a message function. A message function may allow a user to record a message. The message may be transmitted to the contact.

If the contact is not in a user's contact list, the connection options state 3009 may include a button or recognize a hand gesture for a function which adds the contact to a user's contact list. If the contact is in a user's contact list, the state may include a button (e.g., button 4206) or recognize a hand gesture for a function which removes the contact from a user's contact list. The state also may display a button (e.g., button 4207) or recognize a hand gesture for an exit function, which causes the system to return to the menu state 3004. Alternatively, an exit function may return to a standby state 3001.

The connection options state 3009 may display a contact name 4208 and information 4209 about a contact. Displaying information about a contact may include searching and retrieving information from a database. The system may include a process to initialize communications with the selected contact in a connecting state 3010. The process may proceed to the connecting state 3010 in response to a user completing entry of a phone number or contact, initiating an auto-completion process, selecting a dial function, accepting an incoming call, etc.

The system may include a face recognition process. The identity of a caller may be transmitted when establishing communications with a remote user, so that a remote user's system may display the identity of the person calling. The system may display a connection status while in the connecting state 3010. The connection status may indicate a strength of the connection (e.g., strong or weak) or may indicate availability of the connection (e.g., connected or disconnected).

A messages menu state 3011 permits a user to check messages. A message menu state 3011 may present a list of messages. A list of messages may appear similar to a list of contacts as presented in FIG. 40 or FIG. 41. Selecting a message allows the message to be played in a message playback state 3012.

Playing a message in a message playback state 3012 may include presenting an audio or video recording. A message playback state 3012 may display a set of buttons or recognize a set of hand gestures corresponding to playback operations (e.g., pause, fast forward, rewind, and erase).

In an implementation of a message playback state 3012, a representation of a user may occlude a part of a video recording being played. A representation of a user may be blended with recorded video. Alternatively, a representation of a user may be displayed in a separate part of a message state user interface.

Figure 43:
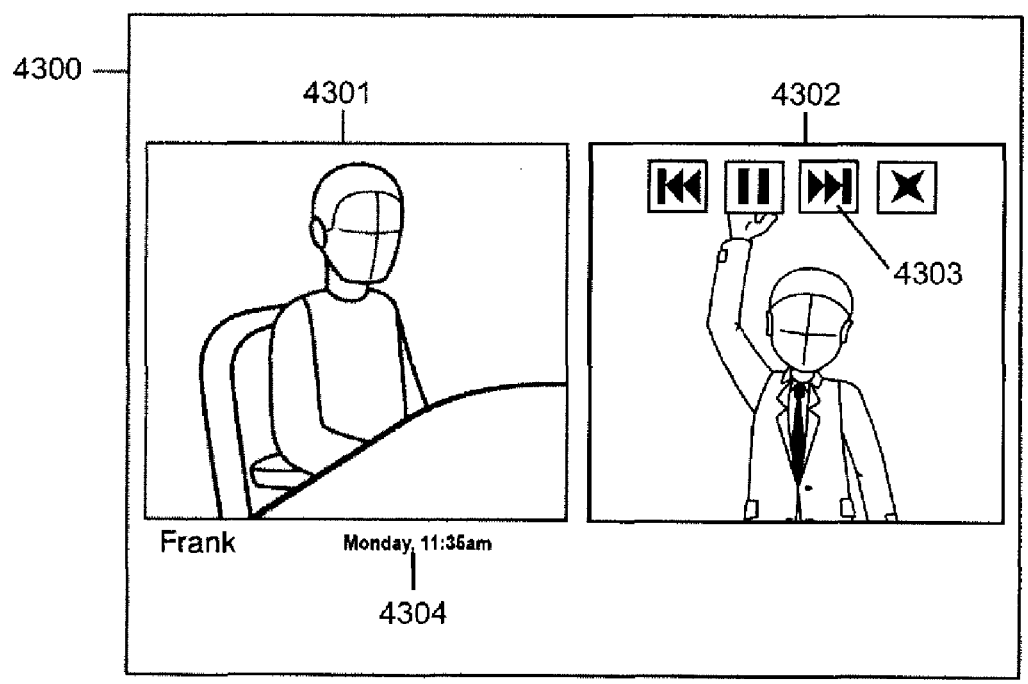
FIG. 43 illustrates an example of a user interface in a message playback state.

FIG. 43 illustrates an example of a user interface in a message playback state. Referring to the example of FIG. 43, a user interface 4300 may include a part 4301 where a recorded video is played. The user interface 4300 also may include a part 4302 where a representation of a user is displayed. Buttons (e.g., button 4303) may be included in part 4302, providing access to playback operations. A user interface further may include information 4304 about the contact and message (e.g., date and time).

A muted state 3013 may provide local users with privacy during a call. A muted state 3013 may continue to display a remote user. A muted state 3013 may include a button or recognize a hand gesture to resume a call, thereby re-entering the call state 3003. A muted state 3013 may include a button or recognize a hand gesture to end a call, thereby going to either a standby 3001 or menu state 3004. A muted state 3013 may include buttons or recognize a hand gesture to enter a direct dial 3005, redial 3006, search 3007, or browse state 3008, whereby the selected contact may be added to the existing call (e.g., three-way calling).

The system may include a configuration state 3014. The configuration state 3014 may present communications and network options (e.g., IP address). The configuration state 3014 may present personal address book functions (e.g., to add, edit, or delete a contact). The configuration state 3014 may include a face recognition learning process, whereby a user's face is analyzed and stored with the user's name. The stored image may be used as a template with a face recognition process.

Figure 44:
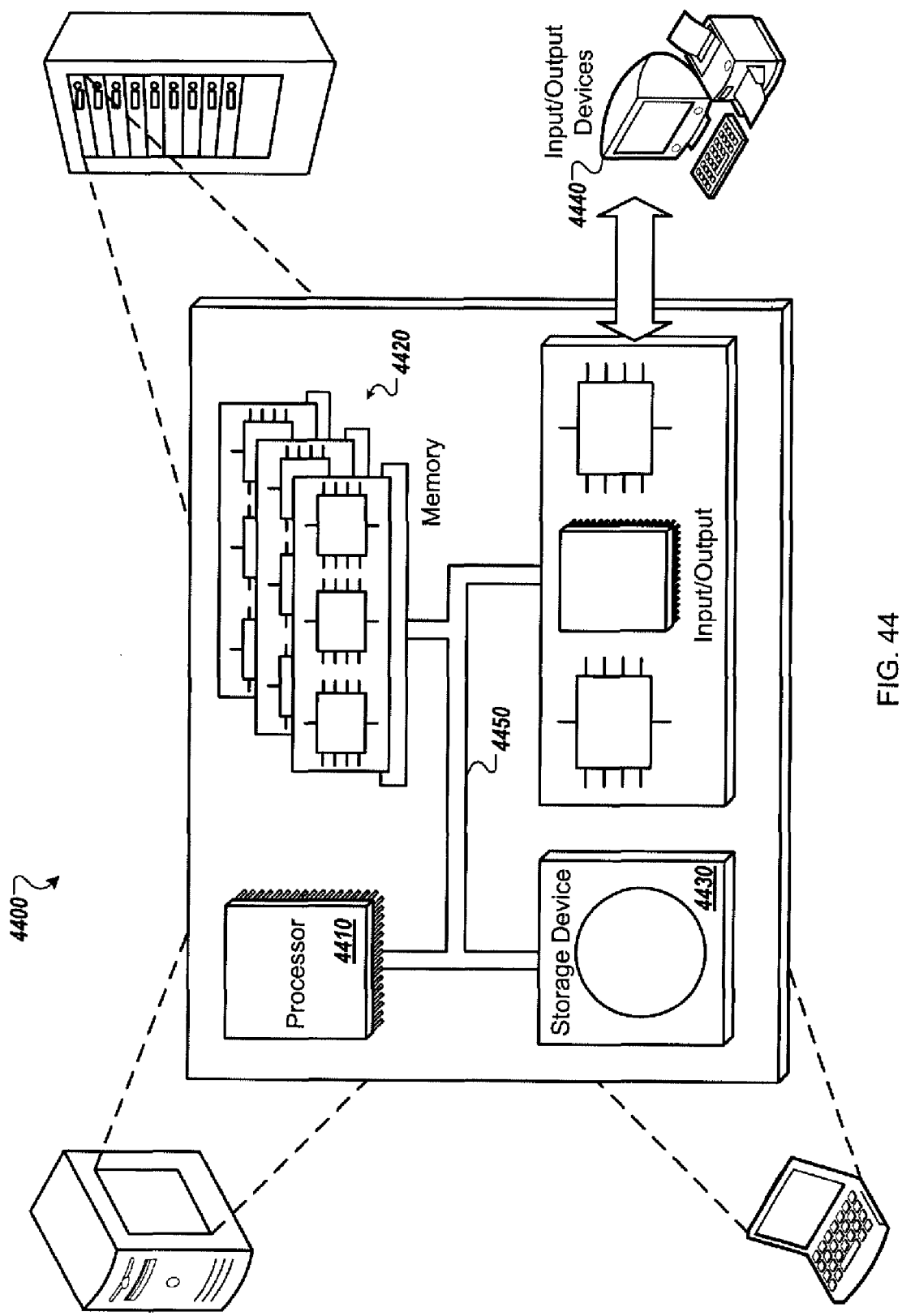
FIG. 44 illustrates components of an exemplary computer processing system, according to another general implementation.

FIG. 44 is a schematic diagram of an example of a generic or special purpose computer system 4400. The system 4400 may be used for the operations described in association with the process 400 according to one implementation. The system 4400 includes a processor 4410, a memory 4420, a storage device 4430, and an input/output device 4440. Each of the components 4410, 4420, 4430, and 4440 are interconnected using a system bus 4450. The processor 4410 is capable of processing instructions for execution within the system 4400. In one implementation, the processor 4410 is a single-threaded processor. In another implementation, the processor 4410 is a multi-threaded processor. The processor 4410 is capable of processing instructions stored in the memory 4420 or on the storage device 4430 to display graphical information for a user interface on the input/output device 4440.

The memory 4420 stores information within the system 4400. In one implementation, the memory 4420 is a computer-readable medium. In one implementation, the memory 4420 is a volatile memory unit. In another implementation, the memory 4420 is a non-volatile memory unit.

The storage device 4430 is capable of providing mass storage for the system 4400. In one implementation, the storage device 4430 is a computer-readable medium. In various different implementations, the storage device 4430 may be a floppy disk device, a hard disk device, an optical disk device, or a tape device.

The input/output device 4440 provides input/output operations for the system 4400. In one implementation, the input/output device 4440 includes a keyboard and/or pointing device. In another implementation, the input/output device 4440 includes a display unit for displaying graphical user interfaces.

The features described may be implemented in digital electronic circuitry, or in computer hardware, firmware, software, or in combinations of them. The apparatus may be implemented in a computer program product tangibly embodied in an information carrier, e.g., in a machine-readable storage device or in a propagated signal, for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the claims. Accordingly, other embodiments are within the scope of the following claims.

What is claimed is:

1. A computer-implemented method comprising:
   recognizing an engagement gesture of a user from a sequence of camera images, wherein
   a plurality of persons are present in at least one image of the sequence of camera images, the plurality of persons including the user;
   focusing one or more camera images on the user using a user reference location identified based on the recognized engagement gesture and a face of the user;

providing a user interface comprising a control and a representation of the user;
causing the representation to interact with the control based on the recognized gesture; and
controlling a telecommunication session based on the interaction.

2. The method of claim 1, wherein:
controlling the telecommunication session further comprises changing the telecommunication session from a first state to a second, different state, and
the first or second states comprise a standby state, a notification state, an outgoing call state, a connecting state, a mute state, a menu state, a connection options state, a direct dial state, a redial state, a search state, a browse state, a message menu state, a message playback state, or a configuration state.

3. The method of claim 1, wherein the telecommunication session further comprises a voice and video telecommunication session.

4. The method of claim 1, wherein controlling the telecommunication session further comprises changing the telecommunication session from a standby state to a call or menu state based on recognizing an engagement gesture.

5. The method of claim 1, further comprising:
determining an identity of the user; and
enabling the control based on the determined identity.

6. The method of claim 5, further comprising changing the telecommunication session from a connecting state to a call state only if the determined identity of the user matches an intended recipient of a call.

7. The method of claim 1, further comprising:
determining identities of users within the image; and
enabling or disabling the control based on at least one of the determined identities.

8. The method of claim 1, wherein controlling the telecommunication session further comprises changing the telecommunication session to a standby state based on recognizing a disengagement gesture.

9. The method of claim 1, wherein focusing the one of the camera images further comprises maintaining focus of a camera on the user, who is moving.

10. The method of claim 1, wherein focusing the one of the camera images further comprises centering the one of the camera images on the user.

11. The method of claim 1, further comprising localizing audio to focus on the user.

12. The method of claim 1, wherein:
recognizing the engagement gesture of the user further comprises recognizing that a second user has performed a second engagement gesture after a first user has performed a first engagement gesture,
controlling the telecommunication session further comprises changing a focus to the second user based on recognizing that the second user has performed the second engagement gesture.

13. The method of claim 12, further comprising:
determining whether the first user has relinquished the focus,
wherein the focus is changed only if the first user has relinquished the focus.

14. The method of claim 13, wherein determining whether the first user has relinquished the focus further comprises determining whether the first user has finished speaking.

15. The method of claim 13, wherein determining whether the first user has relinquished the focus further comprises determining whether the first user has performed a relinquishment gesture.

16. The method of claim 1, further comprising:
determining an identity of the user,
wherein controlling the telecommunication session further comprises displaying, in a browse state, a set of contacts associated with the determined identity.

17. The method of claim 1, further comprising:
determining an identity of the user based on face recognition,
wherein controlling the telecommunication session further comprises transmitting the determined identity of the user to a recipient of a call placed by the user.

18. A device comprising a processor configured to:
recognize an engagement gesture of a user from a sequence of camera images, wherein:
a plurality of persons are present in at least one image of the sequence of camera images, the plurality of persons including the user;
identify a user reference position of the user based at least in part on the engagement gesture and a face position of the user of the plurality of persons;
set the user as active using the user reference position;
focus one or more camera images on the user using the user reference position;
provide a user interface comprising a control and a representation of the user;
cause the representation to interact with the control based on the recognized gesture; and
control a telecommunication session based on the interaction.

19. A computer-readable storage medium encoded with a computer program comprising instructions that, when executed, operate to cause a computer to perform operations comprising:
recognizing an engagement gesture of a user from a sequence of camera images, wherein:
a plurality of persons are present in at least one image of the sequence of camera images, the plurality of persons including the user;
identifying a user reference position of the user based at least in part on the engagement gesture and a face position of the user of the plurality of persons;
setting the user as active using the user reference position;
focusing one or more camera images on the user using the user reference position;
providing a user interface comprising a control and a representation of the user;
causing the representation to interact with the control based on the recognized gesture; and
controlling a telecommunication session based on the interaction.

20. The method of claim 1, further comprising:
identifying a user reference position of the user based at least in part on the engagement gesture and a face position of the user of the plurality of persons.

21. The method of claim 20, wherein identifying the user reference position of the user based at least in part on the engagement gesture and the face position of the user of the plurality of persons is at least partially based on a distance between the engagement gesture and the face position.

22. The method of claim 21, wherein the distance is a horizontal distance.

23. An apparatus comprising:
means for recognizing an engagement gesture of a user from a sequence of camera images, wherein
a plurality of persons are present in at least one image of the sequence of camera images, the plurality of persons including the user; means for focusing one or more camera images on the user using a user reference location identified based on the recognized engagement gesture and a face of the user;

means for providing a user interface comprising a control and a representation of the user;
means for causing the representation to interact with the control based on the recognized gesture; and
means controlling a telecommunication session based on the interaction.

* * * * *